(12) United States Patent
Sha et al.

(10) Patent No.: US 11,212,848 B2
(45) Date of Patent: Dec. 28, 2021

(54) SERVICE CARRIER FREQUENCY SELECTING METHOD AND APPARATUS

(71) Applicant: ZTE Corporation, Guangdong (CN)

(72) Inventors: Xiubin Sha, Guangdong (CN); Bo Dai, Guangdong (CN); Qian Dai, Guangdong (CN); Jianxun Ai, Guangdong (CN); Lianbin Xiao, Guangdong (CN); Ting Lu, Guangdong (CN); Zhongda Du, Guangdong (CN); Yuanfang Yu, Guangdong (CN); Sergio Parolari, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/055,813

(22) Filed: Aug. 6, 2018

(65) Prior Publication Data

US 2018/0352590 A1 Dec. 6, 2018

Related U.S. Application Data

(63) Continuation of application No. PCT/CN2017/072270, filed on Jan. 23, 2017.

(30) Foreign Application Priority Data

Feb. 6, 2016 (CN) .......................... 201610084117.1
Mar. 11, 2016 (CN) .......................... 201610140659.6
(Continued)

(51) Int. Cl.
*H04W 76/10* (2018.01)
*H04W 36/00* (2009.01)
(Continued)

(52) U.S. Cl.
CPC ....... *H04W 76/10* (2018.02); *H04W 36/0072* (2013.01); *H04W 72/042* (2013.01);
(Continued)

(58) Field of Classification Search
CPC ...................................................... H04W 76/10
See application file for complete search history.

(56) References Cited

U.S. PATENT DOCUMENTS

2009/0190500 A1 7/2009 Ji et al.
2011/0013577 A1 1/2011 Wang et al.
(Continued)

FOREIGN PATENT DOCUMENTS

| CN | 101547513 A | 9/2009 |
| CN | 101605352 A | 12/2009 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 13), Technical Specification, 3GPP TS 36.213v13.2.0, 381 pages, Jun. 2016.
(Continued)

*Primary Examiner* — Kodzovi Acolatse
*Assistant Examiner* — Abdeltif Ajid
(74) *Attorney, Agent, or Firm* — Perkins Coie LLP

(57) ABSTRACT

Embodiments of the disclosed technologies provide a carrier frequency selecting method and apparatus. The method comprises: determining, by UE, whether information of a service carrier frequency sent by a base station is received, wherein the service carrier frequency is the carrier frequency to carry traffic selected by the base station when a target cell carrying the UE is a multi-carrier cell; residing, by the UE, at a carrier frequency corresponding to the information for a service carrier frequency, if so; and, otherwise, residing, by
(Continued)

the UE, at an original camped carrier frequency. With the embodiments of the disclosed technologies, the problem that a service carrier frequency selecting strategy in related techniques is to perform selection passively and lacks initiative is solved, and a technical basis for balancing loads on carrier frequencies carrying traffic is provided and further system efficiency is enhanced for an NB-IoT system, which is mainly to transmit small data.

21 Claims, 27 Drawing Sheets

(30) Foreign Application Priority Data

Aug. 12, 2016 (CN) .......................... 201610666760.5
Sep. 30, 2016 (CN) .......................... 201610877947.X

(51) Int. Cl.
  *H04W 72/04* (2009.01)
  *H04W 76/27* (2018.01)
  *H04W 74/08* (2009.01)

(52) U.S. Cl.
  CPC ... *H04W 72/0453* (2013.01); *H04W 72/0473* (2013.01); *H04W 74/0833* (2013.01); *H04W 76/27* (2018.02)

(56) References Cited

U.S. PATENT DOCUMENTS

| | | | | |
|---|---|---|---|---|
| 2011/0158118 | A1* | 6/2011 | Chou | H04B 17/318 370/252 |
| 2011/0159903 | A1* | 6/2011 | Yuk | H04L 5/0094 455/507 |
| 2011/0159905 | A1* | 6/2011 | Zheng | H04W 72/005 455/509 |
| 2011/0211571 | A1 | 9/2011 | Ryu et al. | |
| 2011/0317552 | A1 | 12/2011 | Lee et al. | |
| 2012/0202544 | A1* | 8/2012 | Kim | H04W 52/146 455/509 |
| 2013/0029697 | A1* | 1/2013 | Jung | H04W 68/00 455/458 |
| 2013/0039299 | A1* | 2/2013 | Papasakellariou | H04L 1/0073 370/329 |
| 2013/0301442 | A1 | 11/2013 | Martin et al. | |
| 2014/0204853 | A1 | 7/2014 | Ko et al. | |
| 2015/0043465 | A1* | 2/2015 | Ouchi | H04W 72/12 370/329 |
| 2015/0063263 | A1 | 3/2015 | Wei | |
| 2016/0269978 | A1* | 9/2016 | Bashar | H04W 16/14 |
| 2016/0302230 | A1* | 10/2016 | Novlan | H04W 40/244 |
| 2018/0287845 | A1* | 10/2018 | Kim | H04W 4/70 |
| 2018/0376484 | A1* | 12/2018 | Beale | H04W 72/0473 |

FOREIGN PATENT DOCUMENTS

| | | |
|---|---|---|
| CN | 101841868 A | 9/2010 |
| CN | 102308640 A | 1/2012 |
| CN | 104322124 A | 1/2015 |
| CN | 105101344 A | 11/2015 |
| EP | 2 866 366 A1 | 4/2015 |
| JP | 2011-517513 A | 6/2011 |
| KR | 10-2010-0052390 A | 5/2010 |
| KR | 10-2011-0084965 A | 7/2011 |
| KR | 10-2012-0114400 A | 10/2012 |
| KR | 10-2013-0006704 A | 1/2013 |
| WO | 2009/116691 A1 | 9/2009 |

OTHER PUBLICATIONS

3rd Generation Partnership Project; Technical Specification Group Radio Access Network; Evolved Universal Terrestrial Radio Access (E-UTRA); Physical layer procedures (Release 13), Technical Specification, 3GPP TS 36.213v13.0.1, 326 pages, Jan. 2016.
Ericsson, "Definition of parameter for downlink reference signal transmit power," 3GPP TSG-RAN1 Meeting #55, Prague, Czech Republic, R1-084631, 2 pages, Nov. 2008.
Extended Search Report dated Jan. 10, 2019 for European Application No. 17746870.9, filed on Jan. 23, 2017 (9 pages).
International Search Report and Written Opinion dated Mar. 20, 2017 for International Application No. PCT/CN2017/072270, filed on Jan. 23, 2017 (13 pages).
Japanese Office Action dated Jun. 4, 2019 for Japanese Patent Application No. 2018-541153, filed on Jan. 23, 2017 (7 pages).
Japanese Office Action dated Oct. 23, 2019 for Japanese Patent Application No. 2018-541153, filed on Jan. 23, 2017 (9 pages).
LG Electronics, "Discussions on measurement for NB-IoT," 3GPP TSG RAN WG1 NB-IoT Ad-Hoc Meeting, Sophia Antipolis, France, R1-161969, 2 pages, Mar. 2016.
Nokia Networks, et al., "Remaining issues on NB-RS for NB-IoT," 3GPP TSG-RAN WG1 NB-IoT Ad-Hoc Meeting, Sophia Antipolis, France, R1-161847, 3 pages, Mar. 2016.
Nokia, et al., "NB-IoT—Further details on RA procedure for supporting multiple PRBs," 3GPP TSG-RAN WG2 Meeting #93bis, Dubrovnik, Croatia, R2-162639, 3 pages, Apr. 2016.
Japanese Office Action dated May 19, 2020 for Japanese Patent Application No. 2018-541153, filed on Jan. 23, 2017 (7 pages).
Korean Office Action dated Mar. 31, 2020 for Korean Patent Application No. 10-2018-7024940, filed on Aug. 29, 2018 (15 pages).
Chinese Office Action dated Jul. 27, 2020 for Chinese Patent Application No. 201610877947, filed on Sep. 30, 2016 (33 pages).
Korean Office Action dated Oct. 12, 2020 for Korean Patent Application No. 10-2018-7024940, filed on Jan. 23, 2017 (17 pages).
European Office Action dated Jun. 28, 2021 for European Application No. 17746870.9, filed on Jan. 23, 2017 (7 pages).
ZTE, "Remaining power control issue on multiple NB-IoT carriers operation," 3GPP TSG RAN WG1 Meeting #86, Gothenburg, Sweden, R1-167317, 2 pages, Aug. 22-26, 2016.

* cited by examiner

SERVICE CARRIER FREQUENCY SELECTING METHOD AND APPARATUS

CROSS REFERENCE TO RELATED APPLICATIONS

This patent document is a continuation of and claims priority to International Patent Application No. PCT/CN2017/072270, filed on Jan. 23, 2017, which claims the benefit of priority of Chinese Patent Application No. 201610084117.1, filed on Feb. 6, 2016; Chinese Patent Application No. 201610140659.6, filed on Mar. 11, 2016; Chinese Patent Application No. 201610666760.5, filed on Aug. 12, 2016; and Chinese Patent Application No. 201610877947.X, filed on Sep. 30, 2016. The entire contents of the before-mentioned patent applications are incorporated by reference as part of the disclosure of this document.

FIELD OF THE TECHNOLOGY

The patent document relates to the field of communication and, more particularly, to a carrier frequency selecting method and apparatus.

BACKGROUND

Machine to Machine (M2M) communication is an important issue in the study of $5^{th}$ Generation (5G) Mobile Communication Technology, and it is also an important application area for future wireless communication. In the M2M project, a research subproject of a Narrow Band-Internet of Things (NB-IoT) is proposed for characteristics of low-cost, low-throughput terminals, for the purpose of providing a low-throughput wireless communication service for the low-cost terminals of the NB-IoT in the frequency band of 200 KHz.

In order to save air interface signaling and achieve fast access for UE, the NB-IoT introduces the following context suspension and resume mechanism: when User Equipment (UE) and a Mobility Management Entity (MME) complete uplink and downlink data transmission, the UE's bearer context and AS context can be suspended on an evolved base station (eNB, also called eNodeB) side and the MME side by using a Radio Resource Control (RRC) connection suspension mechanism; and, UU and S1 interfaces connections of the UE are quickly restored by connecting the RRC to a resume process, if data transmission between the UE and the MME is required subsequently.

Taking into account the capacity of a single-carrier cell of the 200 KHz spectrum bandwidth is very small, access to a large number of NB-IoT terminal will inevitably suffer a limited capacity, and a simple strategy to expand a capacity is to cover a same area with multiple carrier frequencies. However, if each carrier serves as one cell independently, there are the following two problems: 1) in a same coverage area there are multiple cells of the same coverage, and too many cells will cause unnecessary wireless quality measurement overhead; 2) a broadcast channel and a synchronization channel need to be configured for each carrier, which wastes resources of the carrier. Therefore, it is necessary to introduce the following multi-carrier cell strategy: a plurality of single carrier cells within a same eNodeB that cover a same area are aggregated into a multi-carrier cell. The specific manifestation is as follows: multiple carriers share one physical cell identification and share a broadcast channel and a synchronization channel, and a traffic channel can be transmitted at a certain carrier within the cell, wherein a carrier carrying the broadcast channel and the synchronization channel is called an Anchor Carrier while a carrier not carrying the broadcast channel or the synchronization channel is called a Non-Anchor carrier.

The current service carrier frequency selecting strategy proposed is that the traffic for one UE is evenly distributed to different carrier frequencies based on the UE's International Mobile Subscriber Identification Numbers (IMSIs), or the traffic for one UE is dynamically scheduled at multiple carrier frequencies by using a frequency hopping strategy. However, there may be a load imbalance problem with evenly distributing the traffic for one UE to multiple carrier frequencies based on the IMSIs and there may be a problem of UE frequency switching with dynamically scheduling the traffic for one UE on multiple carriers, which is also inefficient for an NB-IoT system mainly to transmit a small amount of data.

At present, there has not been a solution to the problem that a service carrier frequency selecting strategy in related techniques is to perform selection passively and lacks initiative.

SUMMARY

Embodiments of the disclosed technologies provide a carrier selecting method and apparatus so as to at least solve the problem that a service carrier frequency selecting strategy in related techniques is to perform selection passively and lacks initiative.

According to an embodiment of the disclosed technologies, provided is a carrier frequency selecting method comprising: determining, by UE, whether information for a service carrier frequency sent by a base station is received, wherein the service carrier frequency is the carrier to carry a service traffic selected by the base station when a target cell carrying the UE is a multi-carrier cell; residing, by the UE, at a carrier corresponding to the information of a service carrier frequency, if the determination result is yes; and, otherwise, residing, by the UE, at an original camped carrier.

Alternatively, the determining, by UE, whether information for a service carrier frequency sent by a base station is received comprises: receiving, by the UE, an RRC connection setup message, an RRC connection resume message, an RRC connection reestablishment message, or an RRC connection reconfiguration message; determining, by the UE, whether the RRC connection setup message, the RRC connection resume message, the RRC connection reestablishment message, or the RRC connection reconfiguration message received carries the information for a service carrier frequency.

Alternatively, a subsequent flow of the UE is performed at the service carrier frequency if the UE determines that the information for a service carrier frequency sent by a base station is received, and, otherwise, the subsequent flow of the UE is performed at a current carrier.

Alternatively, the subsequent flow of the UE comprises at least one of the following processes of the UE in a current connection mode: a data transmission and reception process, signaling transmission and reception transceiver process and random access process.

Alternatively, a random access parameter broadcast by the cell is used as a random access parameter of the service carrier frequency.

Alternatively, when a UE carried by a multi-carrier cell is switched from a connection mode to an idle mode, a strategy for selecting a camped carrier for the UE is: when it is determined that an RRC release message, an RRC connection suspension message, an RRC connection setup message, or an RRC connection resume message sent by a base station is received, wherein the RRC release message or the RRC connection suspension message carries the information for a service carrier frequency, the UE operates at a carrier corresponding to the information for a service carrier frequency carried in the RRC release message or the RRC connection suspension message; or when it is determined that an RRC release message, or an RRC connection suspension message, and/or an RRC connection setup message, and/or an RRC connection resume message sent by a base station is received, wherein the RRC release message and/or the RRC connection suspension message do not carry the information for a service carrier frequency but the RRC connection setup message or the RRC connection resume message carries the information for a service carrier frequency, the UE operates at a carrier corresponding to the information for a service carrier frequency carried in the RRC connection setup message or the RRC connection resume message; or when it is determined that an RRC release message, an RRC connection suspension message, and/or an RRC connection setup message, and/or an RRC connection resume message sent by a base station is received, wherein none of the RRC release message, the RRC connection suspension message, and/or the RRC connection setup message, and/or the RRC connection resume message carries the information for a service carrier frequency, the UE operates at a carrier at which the UE operates in an idle mode last time.

Alternatively, before the UE receiving information for a service carrier frequency sent by a base station, the method further comprises: transmitting, by the UE, information for a multi-carrier support capability of the UE to the base station, wherein the information for a multi-carrier support capability of the UE is used to indicate whether the UE supports a multi-carrier function.

Alternatively, the information for a multi-carrier support capability of the UE is carried by one of the following messages: an RRC connection setup request, RRC connection resume request, and RRC connection reestablishment request.

Alternatively, the UE's supporting a multi-carrier function means that the UE allows accepting the information for a service carrier frequency configured by the base station.

Alternatively, the UE receiving information for a service carrier frequency sent by a base station comprises: receiving, by the UE, information for transmission power of a narrowband reference signal (NRS) of the service carrier frequency sent by the base station.

Alternatively, the receiving, by the UE, information for transmission power of a narrowband reference signal (NRS) of the service carrier frequency sent by the base station comprises: receiving, by the UE, a system information block (SIB), an RRC connection setup message, an RRC connection resume message, an RRC connection reestablishment message, or an RRC connection reconfiguration message; and, acquiring, by the UE, the information for transmission power of a narrowband reference signal (NRS) of the service carrier frequency from the system information block (SIB), the RRC connection setup message, the RRC connection resume message, the RRC connection reestablishment message, or the RRC connection reconfiguration message.

Alternatively, before the UE receiving information for a service carrier frequency sent by a base station, the method further comprises: receiving, by the UE, information for transmission power of an NRS of the service carrier frequency sent by the base station with a system information block (SIB). The information for transmission power of an NRS of the service carrier frequency provides Energy per Resource Element of the NRS to be used by the UE to perform an RSRP measurement and/or path loss calculation when the UE is assigned to the service carrier frequency.

Alternatively, the method further comprises: The information for transmission power of an NRS of the service carrier frequency is characterized by a deviation from power of an NRS of an Anchor carrier; or, information for transmission power of an NRS corresponding to the service carrier frequency is characterized by an absolute value of the power of the NRS of the service carrier frequency.

Alternatively, before the UE receiving information for a service carrier frequency sent by a base station, the method further comprises: transmitting, by the UE, a narrowband reference signal received power (NRSRP) value to the base station, wherein the NRSRP value is a power value on a resource unit on an Anchor carrier carrying a narrowband reference signal measured by the UE, or the power value on a resource unit on an Anchor carrier carrying a narrowband reference signal measured by the UE plus a offset value, and is used for the base station determining quality of downlink radio coverage of the UE.

Alternatively, the narrowband reference signal received power (NRSRP) value measured by the UE is carried with one of the following messages: an RRC connection setup request, RRC connection resume request, and RRC connection reestablishment request.

Alternatively, the offset value is: a difference between the power of an NRS of a Non-Anchor carrier and the power of an NRS of an Anchor carrier.

Alternatively, a method of determining a wireless coverage level of the UE at the Non-Anchor carrier when an initial physical random access channel (PRACH) of the UE is carried on a Non-Anchor carrier comprises: acquiring, by the UE, the wireless coverage level by comparing a measured narrowband reference signal received power (NRSRP) value of the Anchor carrier plus the offset value with a wireless coverage level threshold, wherein, alternatively, the wireless coverage level threshold is configured by a system information block.

Alternatively, the offset value may be: a difference between the power of a narrowband reference signal (NRS) of a Non-Anchor carrier and the power of an NRS of an Anchor carrier.

Alternatively, the initial physical random access channel (PRACH) of the UE's being carried on a Non-Anchor carrier is as an initial PRACH process, wherein the initial PRACH process refers to a PRACH procedure other than a PRACH process triggered by a physical downlink control channel (PDCCH) order.

According to another embodiment of the disclosed technologies, provided is another carrier selecting method, comprising: determining, by a base station, whether a target cell carrying UE is a multi-carrier cell; if the determination result is yes, transmitting, by the base station, information for a service carrier frequency to the UE, wherein the service carrier frequency is a carrier to carry traffic selected by the base station for the UE.

Alternatively, before the determining, by a base station, whether a target cell carrying UE is a multi-carrier cell, the method also includes: receiving, by the base station, an RRC connection setup request, an RRC connection resume request, or an RRC connection reestablishment request from the UE.

Alternatively, after the receiving, by the base station, an RRC connection setup request, an RRC connection resume request, or an RRC connection reestablishment request from the UE, the method also includes: acquiring, by the base station, information for a multi-carrier support capability of the UE from the RRC connection setup request, the RRC connection resume request, or the RRC connection reestablishment request received, wherein the information for a multi-carrier support capability of the UE is used to indicate whether the UE supports a multi-carrier function.

Alternatively, in a case where the information for a multi-carrier support capability of the UE indicates that the UE supports a multi-carrier function, the method also comprises: selecting, by the base station, a service carrier frequency of the multi-carrier cell for the UE and configuring information for the service carrier frequency.

Alternatively, the transmitting, by the base station, information for a service carrier frequency to the UE comprises: carrying, by the base station, the information for a service carrier frequency in an RRC connection setup message and transmitting it to the UE; or carrying, by the base station, the information for a service carrier frequency in an RRC connection resume message and transmitting it to the UE; or carrying, by the base station, the information for a service carrier frequency in an RRC connection reestablishment message and transmitting it to the UE; or carrying, by the base station, the information for a service carrier frequency carried in an RRC connection reconfiguration message and transmitting it to the UE.

Alternatively, the transmitting, by the base station, information for a service carrier frequency to the UE also comprises: transmitting, by the base station, information for transmission power of an NRS of the service carrier frequency to the UE.

Alternatively, the transmitting, by the base station, information for transmission power of an NRS of the service carrier frequency to the UE also comprises: transmitting, by the base station, the information for transmission power of an NRS of the service carrier frequency carried in a system information block (SIB) to the UE; or transmitting, by the base station, the information for transmission power of an NRS of the service carrier frequency carried in an RRC connection setup message to the UE; or transmitting, by the base station, the information for transmission power of an NRS of the service carrier frequency carried in an RRC connection resume message to the UE; or transmitting, by the base station, the information for transmission power of an NRS of the service carrier frequency carried in an RRC connection reestablishment message to the UE; or transmitting, by the base station, the information for transmission power of an NRS of the service carrier frequency carried in an RRC connection reconfiguration message to the UE.

Alternatively, the method further comprises: the information for transmission power of an NRS corresponding to the service carrier frequency is characterized by a deviation from power of an NRS of an Anchor carrier; the information for transmission power of an NRS corresponding to the service carrier frequency is characterized by an absolute value of the power of the NRS of the service carrier frequency.

Alternatively, in a case where the base station transmits information for a service carrier frequency to the UE, the base station performs a subsequent flow for the UE at the service carrier frequency; and, otherwise, the base station performs a subsequent flow for the UE at a current frequency.

Alternatively, the subsequent flow performed by the base station for the UE comprises at least one of the following processes of the UE in a current connection mode: a data transmission and reception process, signaling transmission and reception transceiver process and random access process.

Alternatively, the method further comprises: broadcasting, by the base station, a random access parameter to the UE, wherein the random access parameter applies to all carrier frequencies within the cell.

Alternatively, the transmitting, by the base station, information for a service carrier frequency to the UE comprises: transmitting, by the base station, the information for a service carrier frequency carried in an RRC release message or an RRC connection suspension message to the UE, wherein the information for a service carrier frequency is information corresponding to a carrier carrying a broadcast channel.

Alternatively, after the receiving, by the base station, an RRC connection setup request, an RRC connection resume request, or an RRC connection reestablishment request from the UE, the method also includes: acquiring, by the base station, a narrowband reference signal received power (NRSRP) value from the RRC connection setup request, the RRC connection resume request, or the RRC connection reestablishment request received, wherein the NRSRP value represents a power value on a resource unit of the NRS received by the UE and is used by the base station to determine quality of downlink radio coverage of the UE.

Alternatively, the method further comprises: determining, by the base station, based on the NRSRP value at least one of: a wireless coverage level, uplink radio coverage level, downlink radio coverage level, physical layer retransmission number of times of uplink channel, and physical layer retransmission number of times of downlink channel.

According to still another embodiment of the disclosed technologies, provided is a carrier selecting method comprising: determining, by UE, whether broadcast information of a multi-carrier cell carries a Paging carrier frequency list and/or a number of Paging carrier frequencies, wherein the Paging carrier frequency list includes a carrier frequency for carrying a Paging message, and the number of Paging carrier frequencies is used to determine the Paging carrier frequency list; if the determination result is yes, selecting, by the UE, a carrier frequency as a carrier frequency for receiving Paging and/or carrying traffic in the Paging carrier frequency list according to a preconfigured rule.

Alternatively, the selecting, by the UE, a carrier frequency as a carrier frequency for receiving Paging and/or carrying traffic in the Paging carrier frequency list according to a preconfigured rule comprises: acquiring, by the UE, according to the preconfigured rule a carrier frequency index corresponding to the carrier frequency for receiving Paging and/or carrying traffic; and, determining a carrier frequency for receiving Paging and/or carrying traffic according to the carrier frequency index.

Alternatively, the acquiring, by the UE, according to the preconfigured rule a carrier frequency index corresponding to the carrier frequency for receiving Paging and/or carrying traffic comprises: acquiring, by the UE, the corresponding carrier frequency index according to an identification of the UE and a mod operation of a number of carrier frequencies carrying the Paging message.

According to still another embodiment of the disclosed technologies, provided is also a carrier frequency selecting method comprising: determining, by a base station, a Paging carrier frequency list and/or a number of Paging carrier frequencies, wherein the Paging carrier frequency list includes a carrier frequency for carrying a Paging message, and the Paging carrier frequency list is used by user equipment (UE) to select a carrier frequency as a carrier frequency for receiving Paging and/or carrying traffic in the Paging carrier frequency list according to a preconfigured rule, and the number of Paging carrier frequencies is used to determine the Paging carrier frequency list; and, carrying, by the base station, the Paging carrier frequency list and/or the number of Paging carrier frequencies in broadcast information of a multi-carrier cell.

According to yet an embodiment of the disclosed technologies, provided is a carrier frequency selecting method comprising: acquiring, by UE, a carrier frequency for carrying Paging information and/or traffic through a PDCCH carrying Paging indication information; and, performing, by the UE, transmission of subsequent Paging information and/or a subsequent service at the carrier frequency.

Alternatively, the acquiring, by UE, a carrier frequency for carrying Paging information and/or traffic through a PDCCH carrying Paging indication information comprises: receiving, by the UE, a carrier frequency list of carrier frequencies carrying Paging message information and/or traffic in a multi-carrier cell through a broadcast; and, acquiring, by the UE, in a PDCCH indices of the carrier frequencies carrying Paging information and/or traffic in the carrier frequency list.

Alternatively, the acquiring, by the UE, in a PDCCH indices of the carrier frequencies carrying Paging information and/or traffic in the carrier frequency list comprises: acquiring, by the UE, through Downlink Control Information (DCI), in the PDCCH the indices of the carrier frequencies carrying Paging information and/or traffic in the carrier frequency list.

According to yet an embodiment of the disclosed technologies, provided is also a carrier frequency selecting method comprising: determining, by a base station, a carrier carrying Paging information and/or traffic; and, indicating, by the base station, through a PDCCH carrying Paging indication information, to UE a carrier carrying Paging information and/or traffic, the carrier being used by the UE to perform transmission of subsequent Paging information and/or a subsequent service at the carrier.

Alternatively, the indicating, by the base station, through a PDCCH carrying Paging indication information, to UE a carrier carrying Paging information and/or traffic comprises: transmitting, by the base station, to the UE a carrier frequency list of carrier frequencies carrying Paging message information and/or traffic in a multi-carrier cell in a way of broadcast; and, carrying, by the base station, in a PDCCH indices of the carrier frequencies carrying Paging information and/or traffic in the carrier frequency list.

Alternatively, the carrying, by the base station, in a PDCCH indices of the carrier frequencies carrying Paging information and/or traffic in the carrier frequency list comprises: carrying, by the base station, through DCI, in the PDCCH the indices of the carrier frequencies carrying Paging information and/or traffic in the carrier frequency list.

According to yet an embodiment of the disclosed technologies, provided is another carrier frequency selecting method comprising: determining, by UE, whether a service carrier frequency list is carried in broadcast information of a multi-carrier cell, wherein the service carrier frequency list includes a carrier frequency for carrying traffic; and, if the determination result is yes, selecting, by the UE, a carrier frequency as a carrier frequency at which the UE initiates traffic request in the service carrier frequency list according to a preconfigured rule.

Alternatively, the selecting, by the UE, a carrier frequency as a carrier frequency at which the UE initiates traffic request in the service carrier frequency list according to a preconfigured rule comprises: acquiring, by the UE, a carrier frequency index for a carrier frequency at which the UE initiates traffic request according to the preconfigured rule; and, determining a corresponding carrier frequency at which the UE initiates traffic request according to the carrier frequency index.

Alternatively, the acquiring, by the UE, a carrier frequency index for a carrier frequency at which the UE initiates traffic request according to the preconfigured rule comprises: acquiring, by the UE, the carrier frequency index according to an identification of the UE and a mod operation of a number of carrier frequencies at which the UE initiates traffic request.

According to yet an embodiment of the disclosed technologies, provided is also another carrier frequency selecting method comprising: determining, by a base station, a service carrier frequency list, wherein the service carrier frequency list includes a carrier frequency for carrying traffic, and is used by UE to select a carrier frequency at which the UE initiates traffic request in the service carrier frequency list according to a preconfigured rule; and, carrying, by the base station, the service carrier frequency list in broadcast information of a multi-carrier cell.

According to another embodiment of the disclosed technologies, provided is a carrier frequency selecting apparatus at UE, the carrier frequency selecting apparatus comprising: a first determination module configured to determine whether information for a service carrier frequency sent by a base station is received, wherein the service carrier frequency is the carrier frequency to carry traffic selected by the base station when a target cell carrying the UE is a multi-carrier cell; and, a module configured to operate at a carrier frequency corresponding to the information of a service carrier frequency when it is determined that the information for a service carrier frequency sent by a base station is received to operate at an original camped carrier if it is determined that the information for a service carrier frequency sent by a base station is not received.

According to another embodiment of the disclosed technologies, provided is another carrier frequency selecting apparatus at a base station, the carrier frequency selecting apparatus comprising: a second determination module configured to determine whether a target cell carrying UE is a multi-carrier cell; and, a first transmission module configured to transmit information for a service carrier frequency to the UE in a case where it is determined that the target cell carrying UE is a multi-carrier cell, wherein the service carrier frequency is a carrier frequency to carry traffic selected by the base station for the UE.

According to still another embodiment of the disclosed technologies, provided is a carrier frequency selecting apparatus at UE, the carrier frequency selecting apparatus comprising: a third determination module configured to determine whether broadcast information of a multi-carrier cell carries a Paging carrier frequency list and/or a number of Paging carrier frequencies, wherein the Paging carrier frequency list includes a carrier frequency for carrying a Paging message, and the number of Paging carrier frequencies is used to determine the Paging carrier frequency list; and, a selection module configured to select a carrier frequency as a carrier frequency for receiving Paging and/or carrying traffic in the Paging carrier frequency list according to a preconfigured rule in a case where it is determined that the broadcast information of a multi-carrier cell carries a Paging carrier frequency list and/or a number of Paging carrier frequencies.

According to still another embodiment of the disclosed technologies, provided is also a carrier frequency selecting apparatus at a base station, the carrier frequency selecting apparatus comprising: a first deciding module configured to determine a Paging carrier frequency list and/or a number of Paging carrier frequencies, wherein the Paging carrier frequency list includes a carrier frequency for carrying a Paging message, and the Paging carrier frequency list is used by user equipment (UE) to select a carrier frequency as a carrier frequency for receiving Paging and/or carrying traffic in the Paging carrier frequency list according to a preconfigured rule, and the number of Paging carrier frequencies is used to determine the Paging carrier frequency list; and, a second transmission module configured to carry the Paging carrier frequency list and/or the number of Paging carrier frequencies in broadcast information of a multi-carrier cell.

According to yet an embodiment of the disclosed technologies, provided is a carrier frequency selecting apparatus at UE, the carrier frequency selecting apparatus comprising: an acquisition module configured to acquire a carrier frequency for carrying Paging information and/or traffic through a PDCCH carrying Paging indication information; and, a transmission module configured to perform transmission of subsequent Paging information and/or a subsequent service at the carrier frequency.

According to yet an embodiment of the disclosed technologies, provided is also a carrier frequency selecting apparatus at a base station, the carrier frequency selecting apparatus comprising: a second determination module configured to determine a carrier frequency carrying Paging information and/or traffic; and, a third transmission module configured to indicate, through a PDCCH carrying Paging indication information, to UE a carrier frequency carrying Paging information and/or traffic, the carrier frequency being used by the UE to perform transmission of subsequent Paging information and/or a subsequent service at the carrier frequency.

In accordance with the disclosed technologies, it is determined by UE whether information for a service carrier frequency sent by a base station is received, wherein the service carrier frequency is the carrier frequency to carry traffic selected by the base station when a target cell carrying the UE is a multi-carrier cell; the UE operates at a carrier frequency corresponding to the information for a service carrier frequency, if the determination result is yes; and, otherwise, the UE operates at an original camped carrier frequency. In this way, the problem that a service carrier frequency selecting strategy in related techniques is to perform selection passively and lacks initiative is solved, and a technical basis for balancing loads on carrier frequencies carrying traffic is provided and further system efficiency is enhanced for an NB-IoT system, which is mainly to transmit small data.

BRIEF DESCRIPTION OF THE DRAWINGS

The drawings described herein are intended to provide a further understanding of the disclosed technologies and constitute a part of the application, and the illustrative embodiments of the described techniques and their descriptions are intended to explain the technologies and are not to be construed as limiting the invention. In the drawings.

EXAMPLE EMBODIMENTS

The disclosed technologies will be described hereinafter in detail with reference to the drawings and embodiments. It is to be noted that embodiments in the present application and features in embodiments may be combined with each other if no conflict is present.

It is to be noted that the terms in the description, claims and drawings of the disclosed technologies, "first," "second," etc., are used to distinguish similar objects and are not necessary for describing a particular order or succession.

Figure 1:
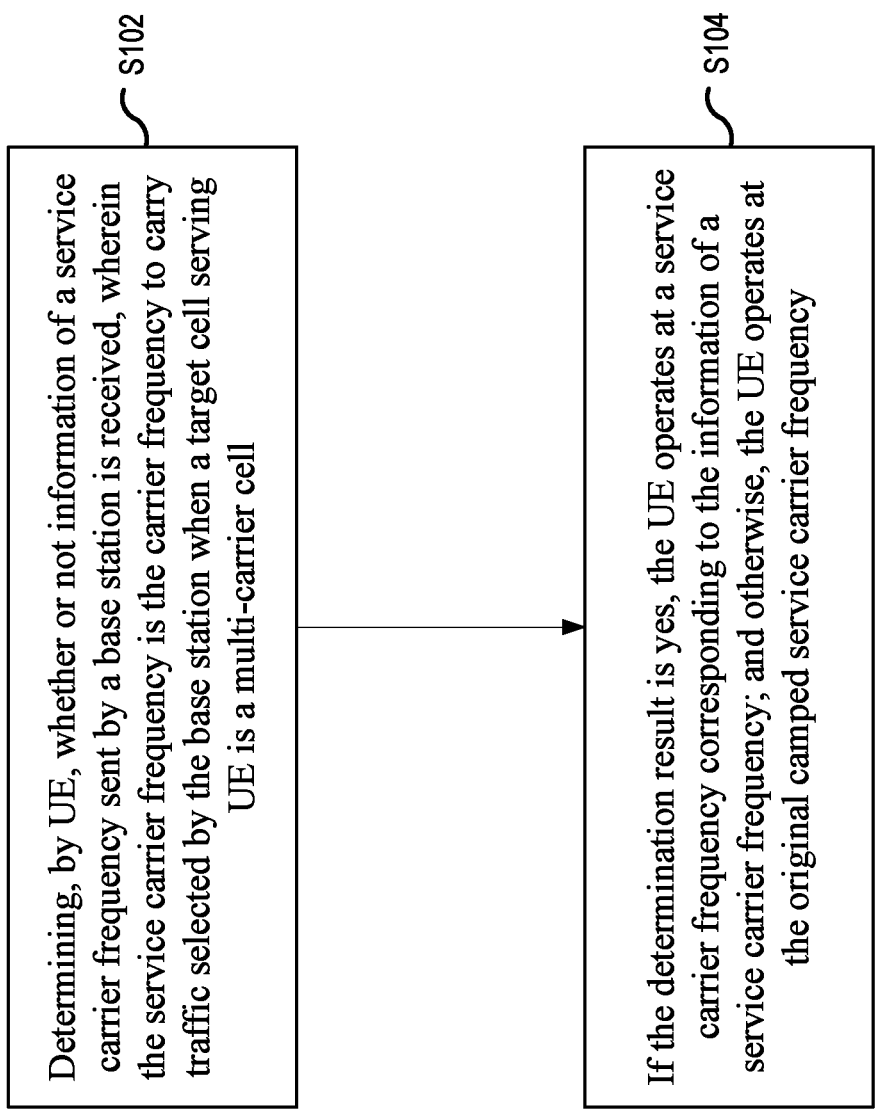
FIG. 1 is a flow chart of a carrier frequency selecting method according to an embodiment of the disclosed technologies.

In the present embodiment, provided is a carrier frequency selecting method. FIG. 1 is a flow chart of the carrier frequency selecting method according to the embodiment of the disclosed technologies. As shown in FIG. 1, the process includes the following steps:

step S102: determining, by UE, whether information for a service carrier frequency sent by a base station is received, wherein the service carrier frequency is the carrier frequency to carry traffic selected by the base station when a target cell carrying the UE is a multi-carrier cell; and step S104: operating, by the UE, at a carrier frequency corresponding to the information for a service carrier frequency, if the determination result is yes; and, otherwise, operating, by the UE, at an original camped carrier frequency.

With the above steps, in a case where a target cell carrying UE is a multi-carrier cell, a base station selects a carrier frequency to carry traffic and transmits information for a service carrier frequency to UE. By receiving the information for a service carrier frequency, the UE selects a corresponding service carrier frequency to perform data transmission and reception. And, if the UE has not received information for a service carrier frequency, the UE operates at an original camped carrier frequency. Thereby, a carrier frequency at which the UE operates can be a carrier frequency to carry traffic selected by the base station actively. Thus, the problem that a service carrier frequency selecting strategy in related techniques is to perform selection passively and lacks initiative is solved, and a technical basis for balancing loads on carrier frequencies carrying traffic is provided and further system efficiency is enhanced for an NB-IoT system, which is mainly to transmit small data.

Alternatively, a base station described herein may be an evolved base station (eNodeB).

As a preferred embodiment, the base station may transmit the information for a service carrier frequency with an RRC connection setup request, an RRC connection resume request, an RRC connection reestablishment message, or an RRC connection reconfiguration message. In this case, in the above step S102, an RRC connection setup message, an RRC connection resume message (i.e., an RRC connection resume completion message), an RRC connection reestablishment message, or an RRC connection reconfiguration message may be received, and then whether the RRC connection setup message, the RRC connection resume message, the RRC connection reestablishment message, or the RRC connection reconfiguration message received carries the information for a service carrier frequency is determined.

As a preferred embodiment, a subsequent flow of the UE is performed at the service carrier frequency if the UE determines that the information for a service carrier frequency sent by a base station is received; and, otherwise, the subsequent flow of the UE is performed at a current camped carrier frequency. Alternatively, the subsequent flow of the UE may include all processes of the UE, such as a data reception and transmission process, a signaling reception and transmission process, and a random process, in a current connection mode.

Alternatively, a random access parameter broadcast by the cell is used as a random access parameter of the service carrier frequency.

Preferably, the UE may operate at a carrier frequency carrying a broadcast channel when the UE is currently in an IDLE state. The specific implementation may be as follows:

1. when performing initial selection in a cell, UE can monitor only a carrier frequency where a broadcast channel is, so it can only choose to operate at the carrier frequency carrying the broadcast channel;

2. when performing reselection in the cell, implementation is made through a broadcast information configuration strategy; specifically, in configuration of broadcast information, an adjacent carrier frequency is based on a carrier frequency carrying a broadcast channel; in this way, the UE will automatically reselect the carrier frequency carrying a broadcast channel when performing reselection;

3. when UE is switched from an RRC connection state to the IDLE mode, it is specified that the UE operates at a carrier frequency carrying a broadcast channel; the specific implementation is as follows:

In a case where it is determined in step S102 that an RRC release message, or an RRC connection suspension message, and/or an RRC connection setup message, and/or an RRC connection resume message sent by the base station are received, and the RRC release message or the RRC connection suspension message carries the information for a service carrier frequency (also known as a redirecting information element), the information for a service carrier frequency is filled in with information corresponding to a carrier frequency carrying a broadcast channel, so that the UE operates at the carrier frequency carrying a broadcast channel; if the RRC release message and/or the RRC connection suspension message do not carry the information for a service carrier frequency (also known as a redirecting information element) but the RRC connection setup message or the RRC connection resume message carries the information for a service carrier frequency (a redirecting information element), the UE operates at a carrier frequency corresponding to the information for a service carrier frequency carried in the RRC connection setup message or the RRC connection resume message; if none of the RRC release message, and/or the RRC connection suspension message, and/or the RRC connection setup message, and/or the RRC connection resume message carries the information for a service carrier frequency (also referred to as a redirect cell), the UE automatically operates at a carrier frequency carrying a broadcast channel and a synchronization channel of a current cell after release.

Specifically, when a UE carried by a multi-carrier cell is switched from a connection mode to an idle mode, a strategy for selecting a carrier frequency for the UE is: when it is determined that an RRC release message, or an RRC connection suspension message sent by the base station is received, wherein the RRC release message or the RRC connection suspension message carries the information for a service carrier frequency, the UE operates at a carrier frequency corresponding to the information for a service carrier frequency carried in the RRC release message or the RRC connection suspension message; or when it is determined that an RRC release message, or an RRC connection suspension message, and/or an RRC connection setup message, and/or an RRC connection resume message sent by a base station is received, wherein the RRC release message and/or the RRC connection suspension message do not carry the information for a service carrier frequency but the RRC connection setup message or the RRC connection resume message carries the information for a service carrier frequency, the UE operates at a carrier frequency corresponding to the information for a service carrier frequency carried in the RRC connection setup message or the RRC connection resume message; or when it is determined that an RRC release message, or an RRC connection suspension message, and/or an RRC connection setup message, and/or an RRC connection resume message sent by a base station is received, wherein none of the RRC release message, the RRC connection suspension message, and/or the RRC connection setup message, and/or the RRC connection resume message carries the information for a service carrier frequency, the UE operates at a carrier frequency at which the UE operates in an idle mode last time.

Alternatively, in a case where the UE determines that the information for a service carrier frequency sent by the base station is received, the UE receives information for transmission power of a narrowband reference signal (NRS) of the service carrier frequency from the RRC connection setup message, the RRC connection resume message, the RRC connection reestablishment message, the RRC connection reconfiguration message, or the system information block (SIB). The information for transmission power of a narrowband reference signal (NRS) of the service carrier frequency provides Energy Per Resource Element (EPRE) of the NRS to be used by the UE to: Reference Signal Received Power (RSRP) measurement, and/or, path loss calculation. The information for transmission power of an NRS corresponding to the service carrier frequency may be characterized by a deviation from power of an NRS of an Anchor carrier, or the information for transmission power of an NRS corresponding to the service carrier frequency may be characterized by an absolute value of the power of the NRS of the service carrier frequency.

Further, a carrier frequency carrying a broadcast channel in a cell can be acquired from SIB information or RRC signaling.

As a preferred embodiment, before the UE receives information for a service carrier frequency sent by a base station, the UE may also transmit information for a multi-carrier support capability of the UE to the base station, wherein the information for a multi-carrier support capability of the UE is used to indicate whether the UE supports a multi-carrier function. In the embodiment, the UE's supporting a multi-carrier function may mean that the UE allows accepting the information for a service carrier frequency configured by the base station.

The information for a multi-carrier support capability of the UE may be carried by one of the following messages: an RRC connection setup request, RRC connection resume request, and RRC connection reestablishment request.

Alternatively, before the UE determines that the information for a service carrier frequency sent by the base station is received, the UE receives information for transmission power of an NRS of the service carrier frequency through an SIB. The information for transmission power of an NRS of the service carrier frequency provides Energy Per Resource Element of the NRS to be used by the UE to perform an RSRP measurement and/or path loss calculation when the UE is assigned to the service carrier frequency. The information for transmission power of an NRS corresponding to the service carrier frequency may be characterized by a deviation from power of an NRS of an Anchor carrier, or the information for transmission power of an NRS corresponding to the service carrier frequency may be characterized by an absolute value of the power of the NRS of the service carrier frequency.

Alternatively, before the UE initiates an initial PRACH process to the base station, the UE is to determine a wireless coverage level where it is as follows:

when the UE operates on an Anchor carrier, the wireless coverage level of the UE is acquired by comparing a narrowband reference signal received power (NRSRP) value of the Anchor carrier measured by the UE with a wireless coverage level threshold; and when the UE operates on a non-Anchor carrier, the wireless coverage level of the UE is acquired by comparing a narrowband reference signal received power (NRSRP) value of the Anchor carrier measured by the UE plus a offset value with a wireless coverage level threshold, wherein the offset value may be a difference between the power of an NRS of a Non-Anchor carrier and the power of an NRS of an Anchor carrier.

A specific method of the UE determining its wireless coverage level according to a type of a carrier at which the UE operates is as follows: for an initial PRACH process when the UE operates on an Anchor carrier, the UE obtains wireless coverage level NRSRP thresholds [threshold 0, threshold 1] after receiving a broadcast message; a wireless coverage level is decided by comparing the wireless coverage level NRSRP thresholds with a current NRSRP measurement as follows: the coverage that the NRSRP value is greater than or equal to threshold 0 is of coverage level 0; the coverage that the NRSRP value is less than threshold 0 and is greater than or equal to threshold 1 is of coverage level 1; and, the coverage that the NRSRP value is less than threshold 1 is of coverage level 2. For an initial PRACH process when the UE operates on a Non-Anchor carrier, the UE obtains wireless coverage level RSRP thresholds [threshold 0, threshold 1] after receiving a broadcast message; a wireless coverage level is decided by comparing the wireless coverage level RSRP thresholds with a current RSRP measurement plus a "deviation of power of an NRS of a Non-Anchor carrier from power of an NRS of an Anchor carrier;" the coverage that the RSRP measurement plus the "deviation of power of an NRS of a Non-Anchor carrier from power of an NRS of an Anchor carrier" is greater than or equal to threshold 0 is of coverage level 0; the coverage that the RSRP measurement plus the "deviation of power of an NRS of a Non-Anchor carrier from power of an NRS of an Anchor carrier" is less than threshold 0 and is greater than or equal to threshold 1 is of coverage level 1; the coverage that the RSRP measurement plus the "deviation of power of an NRS of a Non-Anchor carrier from power of an NRS of an Anchor carrier" is less than threshold 1 is of coverage level 2. The "deviation of power of an NRS of a Non-Anchor carrier from power of an NRS of an Anchor carrier" added in the above determination can be obtained based on information for power of an NRS broadcasted in an SIB.

It will be apparent to those skilled in the art from the description of the above embodiments that the method according to the above embodiments can be realized by means of software plus a necessary general hardware platform, or of course by means of hardware. But in many cases the former is better implementation. Based on such understanding, the substantial part or the part making contribution over the prior art of a technical solution may be embodied in the form of a software product that is stored on a storage medium (such as a ROM/RAM, disk, and optical disc) including a number of instructions for causing a terminal device (which may be a mobile phone, a computer, a server, a network device, or the like) to execute the methods of the various embodiments of the disclosed technologies.

In the present embodiment, provided is a carrier frequency selecting apparatus at user equipment (UE). The apparatus is used to carry out the above embodiments and preferred embodiments, and a description that has been made will not be repeated. As used hereinafter, the term "module" may implement a combination of software and/or hardware of a predefined function. Although the apparatus described in the following embodiment is preferably implemented by software, implementation by hardware or a combination of software and hardware is also possible and conceived.

Figure 2:
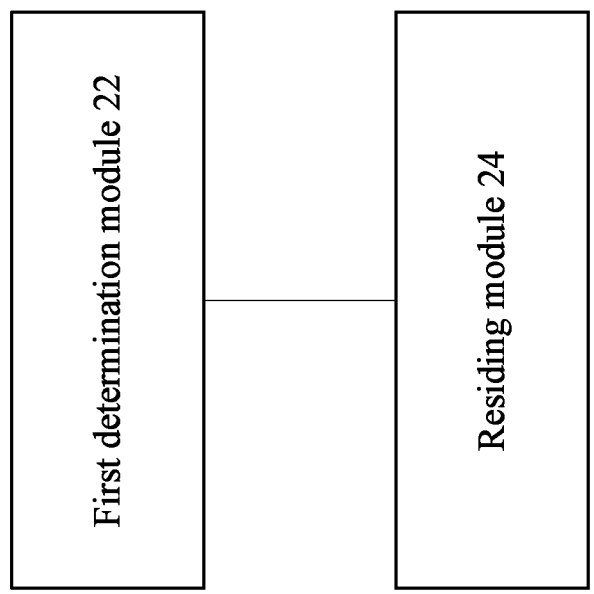
FIG. 2 is a structural block diagram illustrating a carrier frequency selecting apparatus according to an embodiment of the disclosed technologies.

FIG. 2 is a structural block diagram illustrating a carrier frequency selecting apparatus according to the embodiment of the disclosed technologies. As shown in FIG. 2, the apparatus comprises: a first determination module 22 configured to determine whether information for a service carrier frequency sent by a base station is received, wherein the service carrier frequency is the carrier frequency to carry traffic selected by the base station when a target cell carrying the UE is a multi-carrier cell; and, a module 24 configured to operate at a carrier frequency corresponding to the information of a service carrier frequency when it is determined by first determination module 22 that the information for a service carrier frequency sent by a base station is received or operate at an original camped carrier frequency if it is determined that the information for a service carrier frequency sent by a base station is not received.

Figure 3:
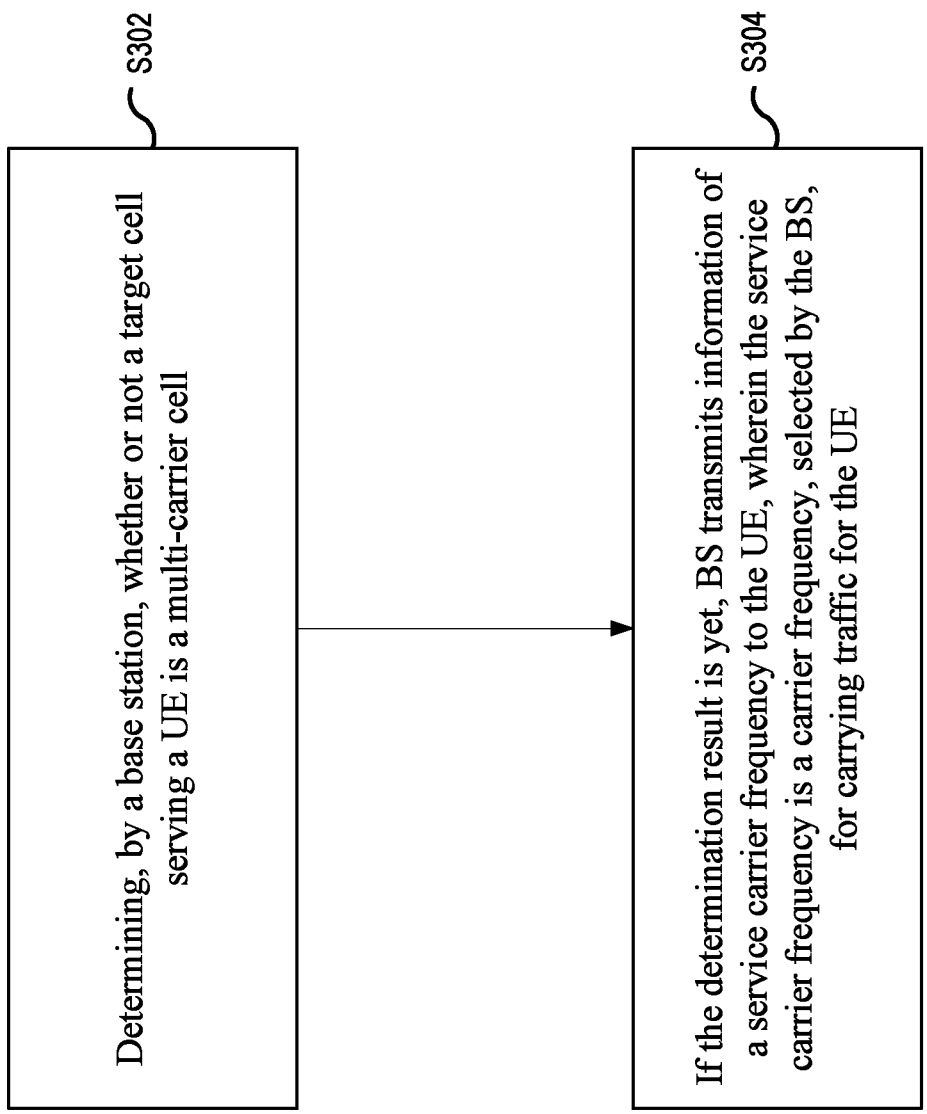
FIG. 3 is a flow chart of another carrier frequency selecting method according to an embodiment of the disclosed technologies.

In the present embodiment, provided is another carrier frequency selecting method. FIG. 3 is a flow chart of another carrier frequency selecting method according to the embodiment of the disclosed technologies. As shown in FIG. 3, the process includes the following steps:

step S302, in which a base station determines whether a target cell carrying UE is a multi-carrier cell;

step S304, in which if the determination result is yes, the base station transmits information for a service carrier frequency to the UE, wherein the service carrier frequency is a carrier frequency to carry traffic selected by the base station for the UE.

With the above steps, a base station transmits information of a service carrier frequency to UE in a case where a target cell carrying the UE is a multi-carrier cell, wherein the service carrier frequency is a carrier frequency to carry traffic selected by the base station for the UE. Thereby, the UE can select a corresponding carrier frequency to perform data transmission and reception by receiving the information for a service carrier frequency, so that a carrier frequency at which the UE operates may be a carrier frequency to carry traffic selected by the base station actively. Thus, the problem that a service carrier frequency selecting strategy in related techniques is to perform selection passively and lacks initiative is solved, and a technical basis for balancing loads on carrier frequencies carrying traffic is provided and further system efficiency is enhanced for an NB-IoT system, which is mainly to transmit small data.

As a preferred embodiment, the UE may send information for a multi-carrier cell support capability of the UE to the base station through an RRC connection setup request, an RRC connection resume reconfiguration request, or an RRC connection reestablishment request. In this case, the base station receives the RRC connection setup request, the RRC connection resume request, or the RRC connection reestablishment request from the UE before step S302. Alternatively, the base station may carry the information for a service carrier frequency in the RRC connection setup message and transmit it to the UE, or the base station may carry the information for a service carrier frequency in the RRC connection resume message and transmit it to the UE, or the base station may carry the information for a service carrier frequency in the RRC connection reestablishment message and transmit it to the UE, or the base station may carry the information for a service carrier frequency carried in the RRC connection reconfiguration message and transmit it to the UE.

Alternatively, the transmitting, by the base station, information for a service carrier frequency to the UE comprises: transmitting, by the base station, information for transmission power of an NRS of the service carrier frequency to the UE in a related message at the same time. The information for transmission power of an NRS corresponding to the service carrier frequency provides Energy Per Resource Element of the NRS to be used by the UE to perform an RSRP measurement and/or path loss calculation. The information for transmission power of an NRS of the service carrier frequency may be characterized by a deviation from power of an NRS of an Anchor carrier, or the information for transmission power of an NRS of the service carrier frequency may be characterized by an absolute value of the power of the NRS of the service carrier frequency.

As a preferred embodiment, the base station may acquire information for a multi-carrier support capability of the UE from the RRC connection setup request, the RRC connection resume request, or the RRC connection reestablishment request received, wherein the information for a multi-carrier support capability of the UE is used to indicate whether the UE supports a multi-carrier function. In the present embodiment, in a case where information for a multi-carrier support capability of the UE indicates that the UE supports a multi-carrier function, the base station can select a service carrier frequency of a multi-carrier and configure information for the service carrier frequency for the UE that supports a multi-carrier function, and the UE that supports a multi-carrier function can accept the information for the service carrier frequency configured by the base station.

Preferably, the UE may operate at a carrier frequency carrying a broadcast channel when the UE is currently in an IDLE state. The specific implementation may be as follows:

1. when performing initial selection in a cell, UE can monitor only a carrier frequency where a broadcast channel is, so it can only choose to operate at the carrier frequency carrying the broadcast channel;

2. when performing reselection in the cell, implementation is made through a broadcast information configuration strategy; specifically, in configuration of broadcast information, an adjacent carrier frequency is based on a carrier frequency carrying a broadcast channel; in this way, the UE will automatically reselect the carrier frequency carrying a broadcast channel when performing reselection;

3. when UE is switched from an RRC connection state to the IDLE mode, it is specified that the UE operates at a carrier frequency carrying a broadcast channel; the specific implementation is as follows:

if the base station carries the information for the service carrier frequency (also known as a redirecting information element) in an RRC release message or an RRC connection suspension message sent, the information for a service carrier frequency is filled in with only information corresponding to a carrier frequency carrying a broadcast channel, so that the UE operates at the carrier frequency carrying a broadcast channel; if the base station does not carry the information for the service carrier frequency (a redirecting information element) in an RRC release message or an RRC connection suspension message, the UE automatically operates at a carrier frequency carrying a broadcast channel and a synchronization channel of a current cell after release.

Specifically, information for a carrier frequency carrying a broadcast channel may be carried in an RRC release message or an RRC connection suspension message to guide the UE to operate at the carrier frequency carrying a broadcast channel; or, information for a carrier frequency carrying a broadcast channel is carried in an RRC connection setup message or an RRC resume completion message but the information for a carrier frequency carrying a broadcast channel is not carried in an RRC release message or an RRC connection suspension message, the UE automatically operates at the carrier frequency carrying a broadcast channel carried in the RRC connection setup or the RRC resume completion message when performing RRC release or RRC connection suspension; or, information for a carrier frequency carrying a broadcast channel is not carried in an RRC connection setup message or an RRC resume completion message and the information for a carrier frequency carrying a broadcast channel is not carried in an RRC release message or an RRC connection suspension message either, the UE automatically operates at a carrier frequency at which the UE receives broadcast in an IDLE mode last time when performing RRC release or RRC connection suspension.

Further, a carrier frequency carrying a broadcast channel in a cell can be acquired from SIB information or RRC signaling.

As a preferred embodiment, in a case where the base station transmits information for a service carrier frequency to the UE, the base station performs a subsequent flow for the UE at the service carrier frequency; and, otherwise, the base station performs a subsequent flow for the UE at a current camped carrier. Alternatively, the subsequent flow that the base station performs for the UE may include all processes of the UE, such as a data reception and transmission process, a signaling reception and transmission process, and a random process, in a current connection mode.

Alternatively, the method further comprises: transmitting, by the base station, information for transmission power of an NRS of the service carrier frequency to the UE through a system message block (SIB), an RRC connection setup message, an RRC connection resume message, an RRC connection reestablishment message, or an RRC connection reconfiguration message. The information for transmission power of a narrowband reference signal (NRS) of the service carrier frequency provides Energy Per Resource Element of the NRS to be used by the UE to perform a reference signal received power (RSRP) measurement and/or path loss calculation when the UE is assigned to the service carrier frequency. The information for transmission power of an NRS of the service carrier frequency may be characterized by a deviation from power of an NRS of an Anchor frequency, or the information for transmission power of an NRS of the service carrier frequency may be characterized by an absolute value of the power of the NRS of the service carrier frequency.

Alternatively, the base station may also broadcast a random access parameter to the UE, wherein the random access parameter applies to all carrier frequencies within the cell.

Figure 4:
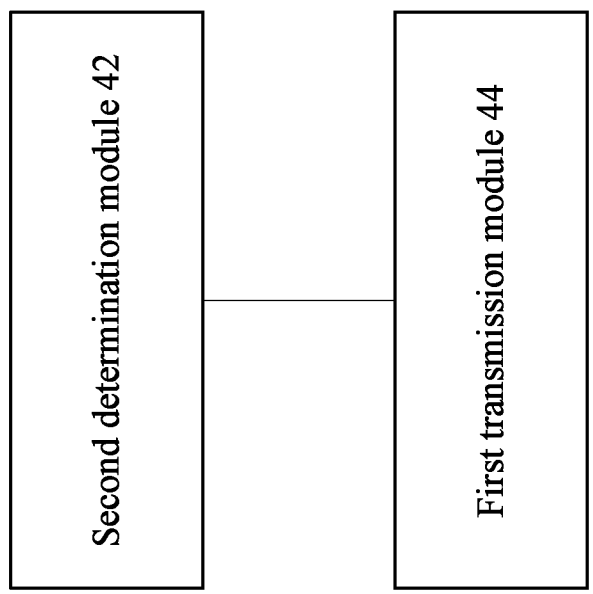
FIG. 4 is a structural block diagram illustrating another carrier frequency selecting apparatus according to an embodiment of the disclosed technologies.

In the present embodiment, provided is another carrier frequency selecting apparatus at a base station. FIG. 4 is a structural block diagram illustrating another carrier frequency selecting apparatus according to the embodiment of the disclosed technologies. As shown in FIG. 4, the apparatus comprises: a second determination module 42 configured to determine whether a target cell carrying UE is a multi-carrier cell; and, a first transmission module 44 configured to transmit information for a service carrier frequency to the UE in a case where it is determined by the second determination module 42 that the target cell carrying UE is a multi-carrier cell, wherein the service carrier frequency is a carrier frequency to carry traffic selected by the base station for the UE.

Figure 5:
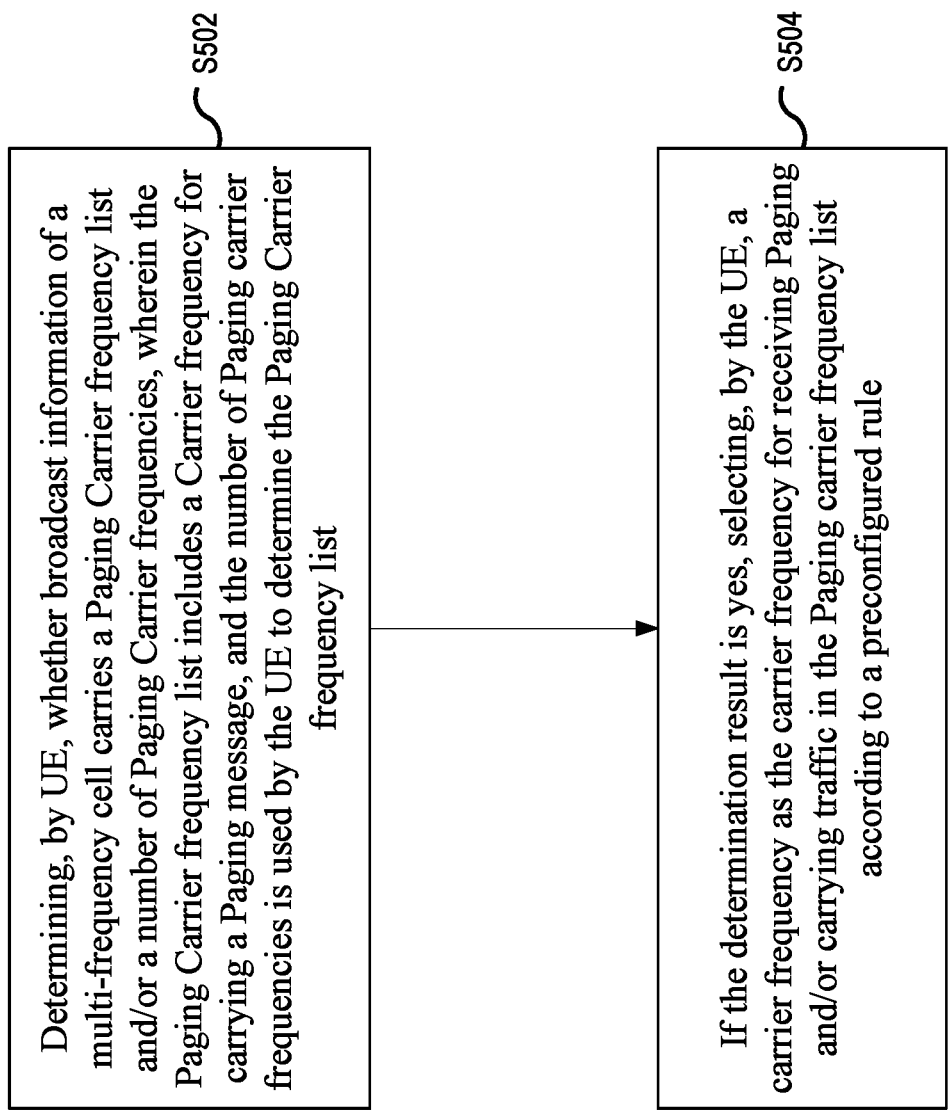
FIG. 5 is a flow chart of still another carrier frequency selecting method according to an embodiment of the disclosed technologies.

In the present embodiment, provided is a carrier frequency selecting method. FIG. 5 is a flow chart of the still another carrier frequency selecting method according to the embodiment of the disclosed technologies. As shown in FIG. 5, the method comprises:

step S502, in which UE determines whether broadcast information of a multi-carrier cell carries a Paging carrier frequency list and/or a number of Paging carrier frequencies, wherein the Paging carrier frequency list includes a carrier frequency for carrying a Paging message, and the number of Paging carrier frequencies is used to determine the Paging carrier frequency list; and step S504, in which if the determination result is yes, the UE selects a carrier frequency as the carrier frequency for receiving Paging and/or carrying traffic in the Paging carrier frequency list according to a preconfigured rule.

With the above steps, a base station carries a Paging carrier frequency list and/or a number of Paging carrier frequencies in broadcast information of a multi-carrier cell, wherein the number of Paging carrier frequencies is used to determine the Paging carrier frequency list, and the Paging carrier frequency list includes a carrier frequency for carrying a Paging message, and the UE selects a carrier frequency as a carrier frequency for receiving Paging and/or carrying traffic in the Paging carrier frequency list according to a preconfigured rule, so that a carrier frequency for the UE may be a carrier frequency selected by the base station actively. Thus, the problem that a service carrier frequency selecting strategy in related techniques is to perform selection passively and lacks initiative is solved, and a technical basis for balancing loads on carrier frequencies is provided and further system efficiency is enhanced for an NB-IoT system, which is mainly to transmit small data.

As a preferred embodiment, a subsequent service flow may be performed on the service carrier frequency specified in accordance with the above method if UE receives the information specifying a service carrier frequency given in the above embodiment, while a service carrier frequency may be selected according to the preconfigured rule given in the present embodiment and a subsequent service flow may be performed at the service carrier frequency if the UE does not receive the information specifying a service carrier frequency given in the above embodiment.

There may be a plurality of preconfigured rules for UE selecting a carrier frequency in the above set of carrier frequencies, e.g., obtaining a corresponding carrier frequency index based on an identification (ID) of the UE and a mod operation of the number of carrier frequencies carrying a Paging message. That is, the UE may acquire according to the preconfigured rule a carrier frequency index corresponding to the carrier frequency for receiving Paging and/or carrying traffic, and determine a carrier frequency for receiving Paging and/or carrying traffic according to the carrier frequency index. The carrier frequency index may be acquired by the UE based on an identification (ID) of the UE and a mod operation of the number of carrier frequencies carrying a Paging message, or a carrier frequency or a carrier frequency index may also be acquired through other similar strategy. The list of carrier frequencies carrying a Paging message may also be a list of all carrier frequencies of the multi-carrier cell, which means that all the carrier frequencies may carry a Paging message.

In an IDLE mode, UE can monitor a carrier carrying a broadcast channel and a carrier carrying its own Paging message in a way of frequency hopping. Specifically, the UE monitors the carrier carrying its own Paging message at a Paging Occasion and at a subsequent Paging message reception phases, and at other times, the UE may monitor the carrier carrying a broadcast channel so as to receive system broadcast and maintain synchronization with the network.

Figure 6:
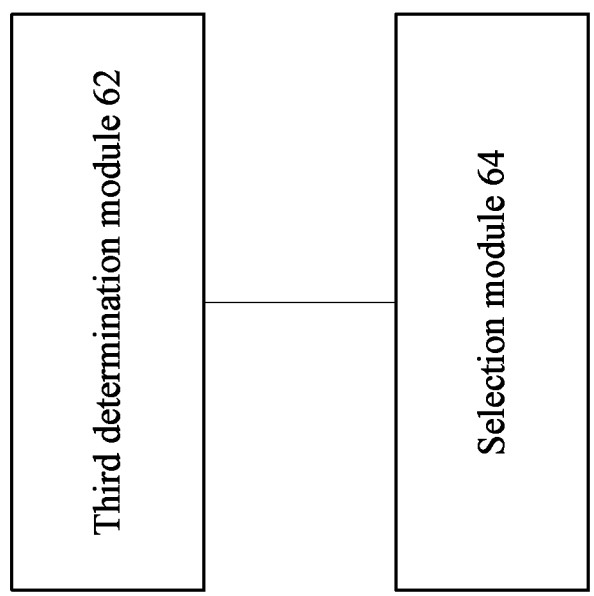
FIG. 6 is a structural block diagram illustrating still another carrier frequency selecting apparatus I according to an embodiment of the disclosed technologies.

In the present embodiment, provided is a carrier frequency selecting apparatus at UE. FIG. 6 is a structural block diagram illustrating the still another carrier frequency selecting apparatus I according to the embodiment of the disclosed technologies. As shown in FIG. 6, the apparatus comprises: a third determination module 62 configured to determine whether broadcast information of a multi-carrier cell carries a Paging carrier frequency list and/or a number of Paging carrier frequencies, wherein the Paging carrier frequency list includes a carrier for carrying a Paging message, and the number of Paging carrier frequencies is used by the UE to determine the Paging carrier frequency list; and, a selection module 64 configured to select a carrier frequency as a carrier frequency for receiving Paging and/or carrying traffic in the Paging carrier frequency list according to a preconfigured rule in a case where it is determined by the third determination module 62 that the broadcast information of a multi-carrier cell carries a Paging carrier frequency list and/or a number of Paging carrier frequencies.

Figure 7:
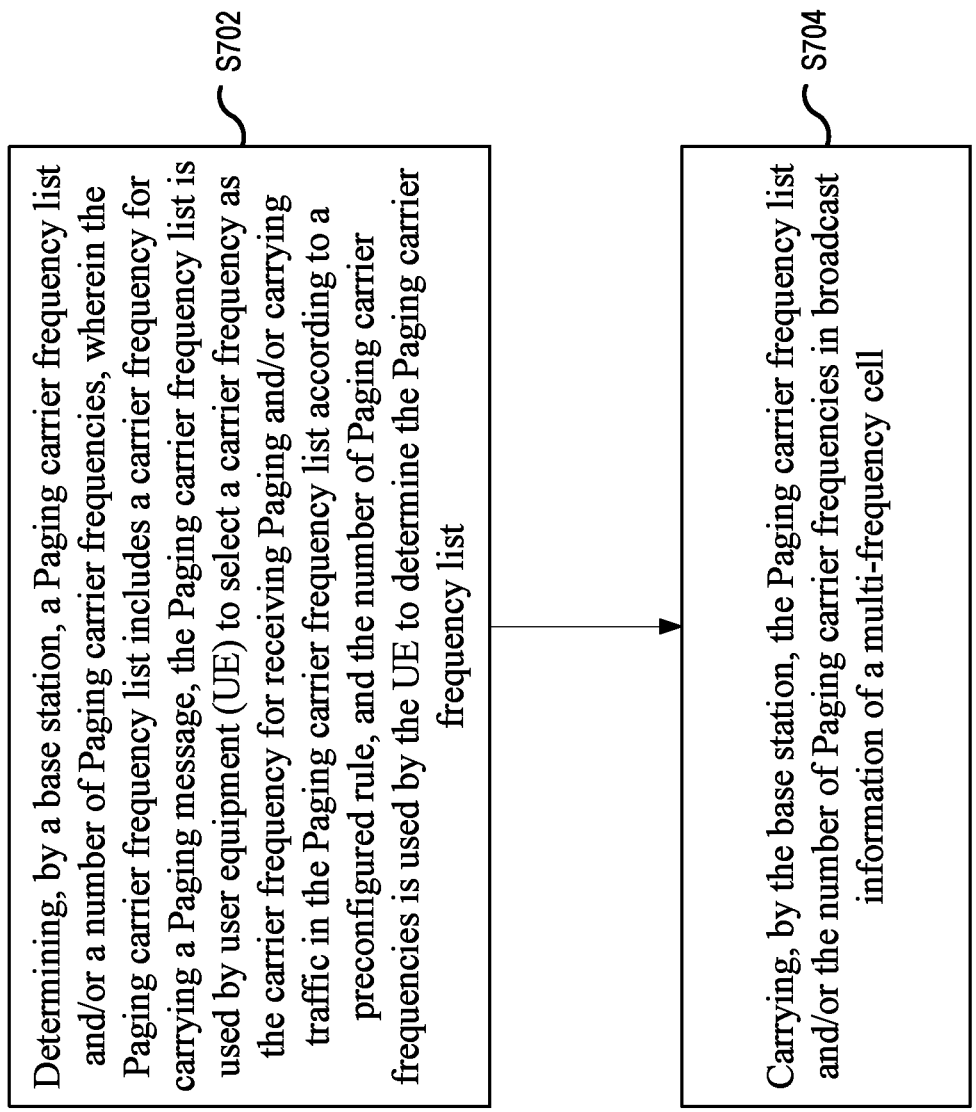
FIG. 7 is a flow chart of still another carrier frequency selecting method II according to an embodiment of the disclosed technologies.

In the present embodiment, provided is a carrier frequency selecting method. FIG. 7 is a flow chart of the still another carrier frequency selecting method II according to an embodiment of the disclosed technologies. As shown in FIG. 7, the method comprises:

step S702, in which a base station determines a Paging carrier frequency list and/or a number of Paging carrier frequencies, wherein the Paging carrier frequency list includes a carrier frequency for carrying a Paging message, the Paging carrier frequency list is used by UE to select a carrier frequency as a carrier frequency for receiving Paging and/or carrying traffic in the Paging carrier frequency list according to a preconfigured rule, and the number of Paging carrier frequencies is used to determine the Paging carrier frequency list; and step S704, in which the base station carries the Paging carrier frequency list and/or the number of Paging carrier frequencies in broadcast information of a multi-carrier cell.

With the above steps, a base station carries a Paging carrier frequency list and/or a number of Paging carrier frequencies in broadcast information of a multi-carrier cell, wherein the number of Paging carrier frequencies is used to determine the Paging carrier frequency list, and the UE selects a carrier frequency as a carrier frequency for receiving Paging and/or carrying traffic in the Paging carrier frequency list according to a preconfigured rule, so that a carrier frequency for the UE may be a carrier frequency selected by the base station actively. Thus, the problem that a service carrier frequency selecting strategy in related techniques is to perform selection passively and lacks initiative is solved, and a technical basis for balancing loads on carrier frequencies is provided and further system efficiency is enhanced for an NB-IoT system, which is mainly to transmit small data.

As a preferred embodiment, a subsequent service flow may be performed on the service carrier frequency specified in accordance with the above method if UE receives the information specifying a service carrier frequency given in the above embodiment, while a service carrier frequency may be selected according to the preconfigured rule given in the present embodiment and a subsequent service flow may be performed at the service carrier frequency if the UE does not receive the information specifying a service carrier frequency given in the above embodiment.

Figure 8:
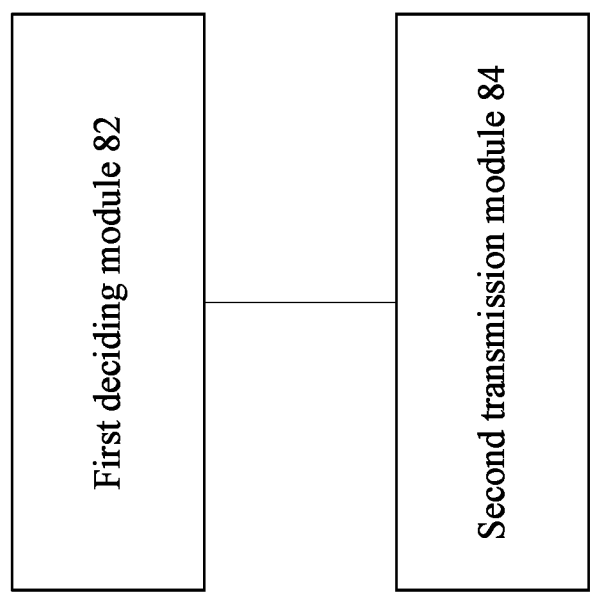
FIG. 8 is a structural block diagram illustrating still another carrier frequency selecting apparatus II according to an embodiment of the disclosed technologies.

In the present embodiment, provided is a carrier frequency selecting apparatus at a base station. FIG. 8 is a structural block diagram illustrating the still another carrier frequency selecting apparatus II according to the embodiment of the disclosed technologies. As shown in FIG. 8, the apparatus comprises: a first deciding module 82 configured to determine a Paging carrier frequency list and/or a number of Paging carrier frequencies, wherein the Paging carrier frequency list includes a carrier frequency for carrying a Paging message, and the Paging carrier frequency list is used by UE to select a carrier frequency as a carrier frequency for receiving Paging and/or carrying traffic in the Paging carrier frequency list according to a preconfigured rule, and the number of Paging carrier frequencies is used by the UE to determine the Paging carrier frequency list; and, a second transmission module 84 configured to carry the Paging carrier frequency list and/or the number of Paging carrier frequencies in broadcast information of a multi-carrier cell.

Figure 9:
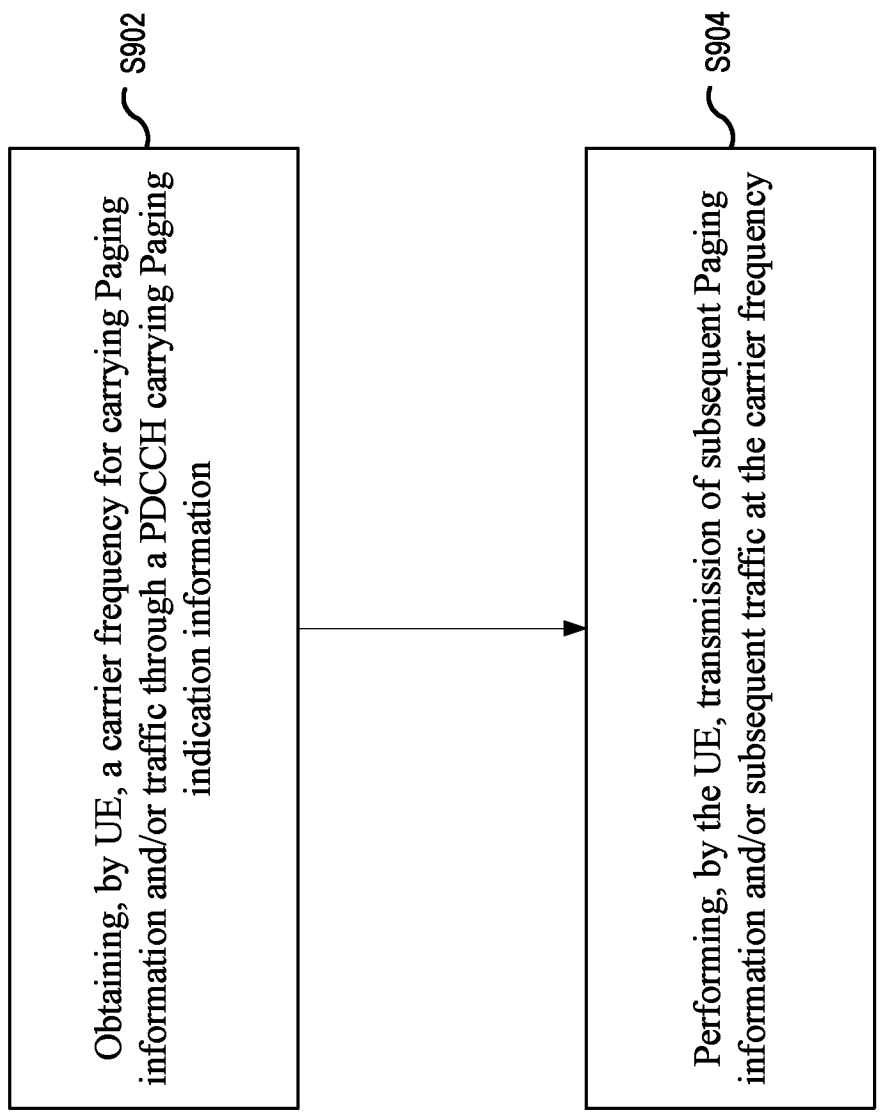
FIG. 9 is a flow chart of yet a carrier frequency selecting method I according to an embodiment of the disclosed technologies.

In the present embodiment, provided is a carrier frequency selecting method. FIG. 9 is a flow chart of yet the carrier frequency selecting method I according to the embodiment of the disclosed technologies. As shown in FIG. 9, the method comprises:

step S902, in which UE obtains a carrier frequency carrying Paging information and/or traffic through a Physical Downlink Control Channel (PDCCH) carrying Paging indication information; and step S904, in which the UE performs transmission of subsequent Paging information and/or subsequent traffic at the carrier frequency.

With the above steps, a base station carries a carrier frequency carrying Paging information and/or traffic in a PDCCH carrying Paging indication information, and UE obtains a carrier frequency carrying Paging information and/or traffic through the PDCCH carrying Paging indication information and performs transmission of subsequent Paging information and/or a subsequent service, so that a carrier frequency for the UE may be a carrier frequency selected by the base station actively. Thus, the problem that a service carrier frequency selecting strategy in related techniques is to perform selection passively and lacks initiative is solved, and a technical basis for balancing loads on carrier frequencies is provided and further system efficiency is enhanced for an NB-IoT system, which is mainly to transmit small data.

Considering that an amount of information that can be carried in the PDCCH is less, the UE can receive, through broadcast, a list of carrier frequencies carrying Paging message information and/or traffic in a multi-carrier cell, and obtain in the PDCCH indices of the carrier frequencies carrying Paging message information and/or traffic in the carrier frequency list, thereby acquiring a corresponding carrier frequency through a combination of the carrier frequency list and the indices.

Specifically, the UE may acquire, through DCI, in the PDCCH the indices of the carrier frequencies carrying Paging information and/or traffic in the carrier frequency list.

Figure 10:
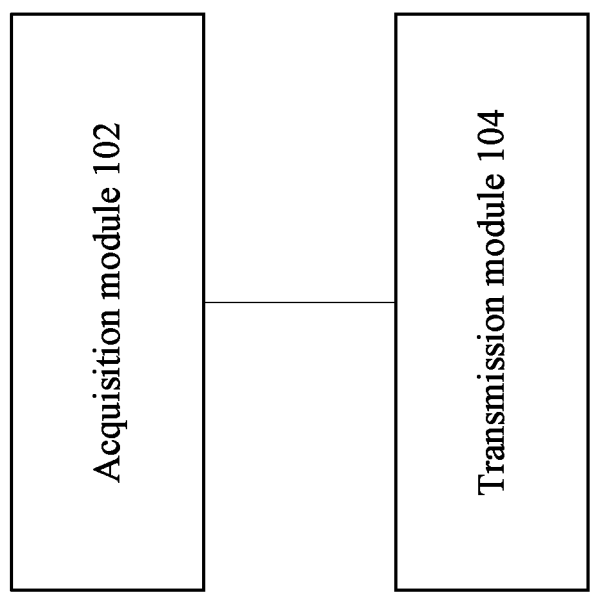
FIG. 10 is a structural block diagram illustrating yet a carrier frequency selecting apparatus I according to an embodiment of the disclosed technologies.

In the present embodiment, provided is a carrier frequency selecting apparatus at a base station. FIG. 10 is a structural block diagram illustrating yet the carrier frequency selecting apparatus I according to the embodiment of the disclosed technologies. As shown in FIG. 10, the apparatus comprises: an acquisition module 102 configured to acquire a carrier frequency for carrying Paging information and/or traffic through a PDCCH carrying Paging indication information; and, a transmission module 104 configured to perform transmission of subsequent Paging information and/or a subsequent service at the carrier frequency.

Figure 11:
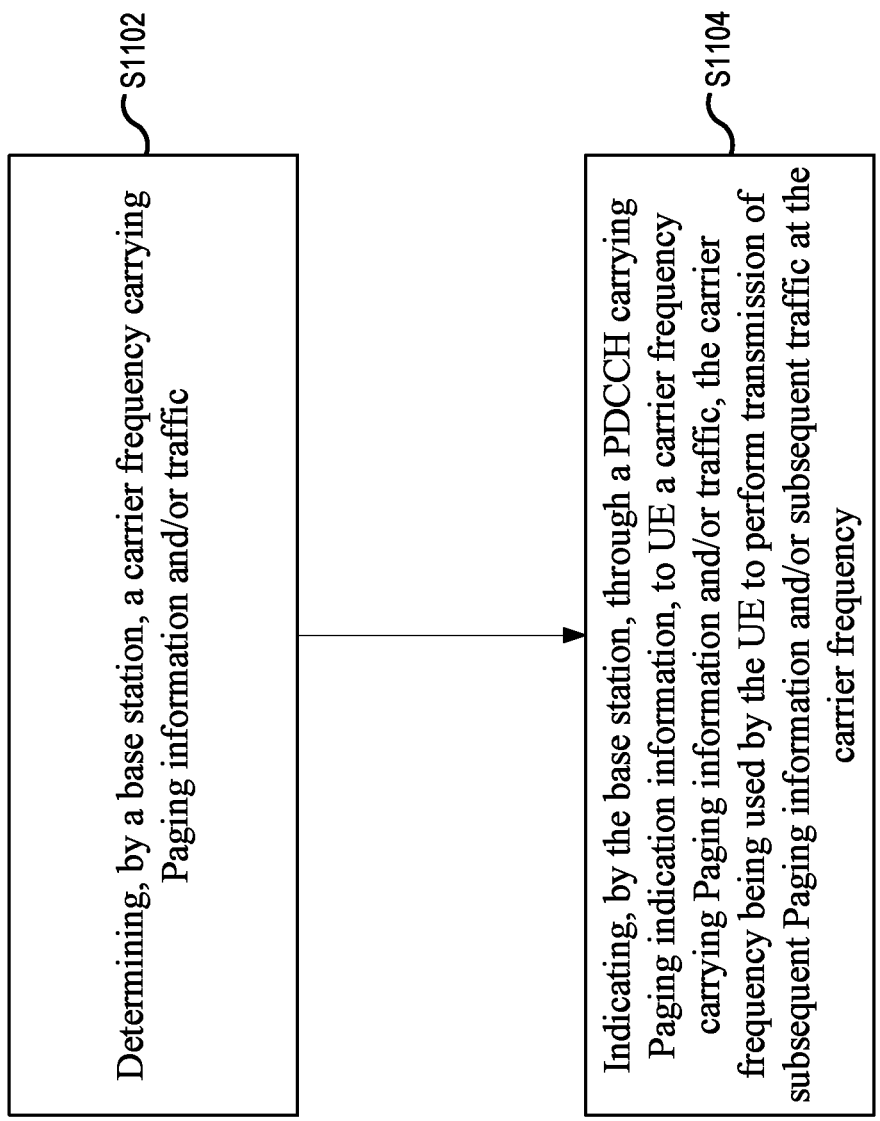
FIG. 11 is a flow chart of yet a carrier frequency selecting method II according to an embodiment of the disclosed technologies.

In the present embodiment, provided is a carrier frequency selecting method. FIG. 11 is a flow chart of yet the carrier frequency selecting method II according to the embodiment of the disclosed technologies. As shown in FIG. 11, the method comprises:

step S1102, in which a base station determines a carrier frequency carrying Paging information and/or traffic; and step S1104, in which the base station indicates, through a PDCCH carrying Paging indication information, to UE a carrier frequency carrying Paging information and/or traffic, the carrier frequency being used by the UE to perform transmission of subsequent Paging information and/or subsequent traffic at the carrier frequency.

With the above steps, a base station carries a carrier frequency carrying Paging information and/or traffic in a PDCCH carrying Paging indication information, and UE obtains a carrier frequency carrying Paging information and/or traffic through the PDCCH carrying Paging indication information and performs transmission of subsequent Paging information and/or a subsequent service, so that a carrier frequency for the UE may be a carrier frequency selected by the base station actively. Thus, the problem that a service carrier frequency selecting strategy in related techniques is to perform selection passively and lacks initiative is solved, and a technical basis for balancing loads on carrier frequencies is provided and further system efficiency is enhanced for an NB-IoT system, which is mainly to transmit small data.

Considering that an amount of information that can be carried in the PDCCH is less, the base station can transmit, through broadcast, a list of carrier frequencies carrying Paging message information and/or traffic in a multi-carrier cell, and carry in the PDCCH indices of the carrier frequencies carrying Paging message information and/or traffic in the carrier frequency list.

Specifically, the base station may carry, through DCI, in the PDCCH the indices of the carrier frequencies carrying Paging information and/or traffic in the carrier frequency list.

Figure 12:
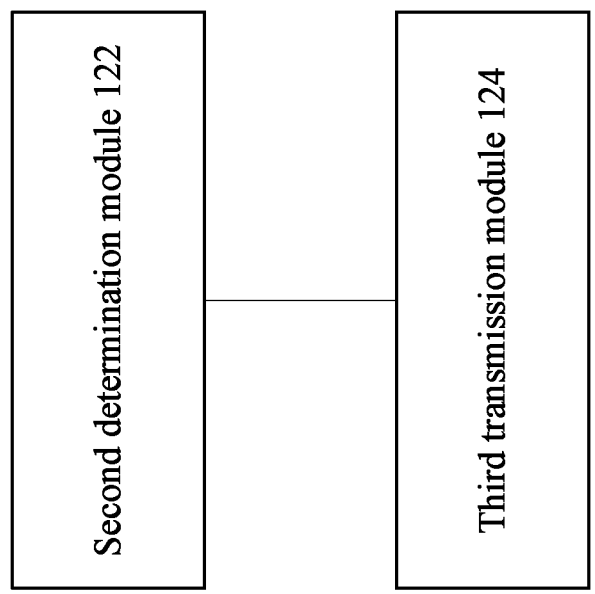
FIG. 12 is a structural block diagram illustrating yet a carrier frequency selecting apparatus II according to an embodiment of the disclosed technologies.

In the present embodiment, provided is a carrier frequency selecting apparatus at a base station. FIG. 12 is a structural block diagram illustrating yet the carrier frequency selecting apparatus II according to the embodiment of the disclosed technologies. As shown in FIG. 12, the apparatus comprises: a second determination module 122 configured to determine a carrier frequency carrying Paging information and/or traffic; and, a third transmission module 124 configured to indicate, through a PDCCH carrying Paging indication information, to UE a carrier frequency carrying Paging information and/or traffic, the carrier frequency being used by the UE to perform transmission of subsequent Paging information and/or a subsequent service at the carrier frequency.

Figure 26:
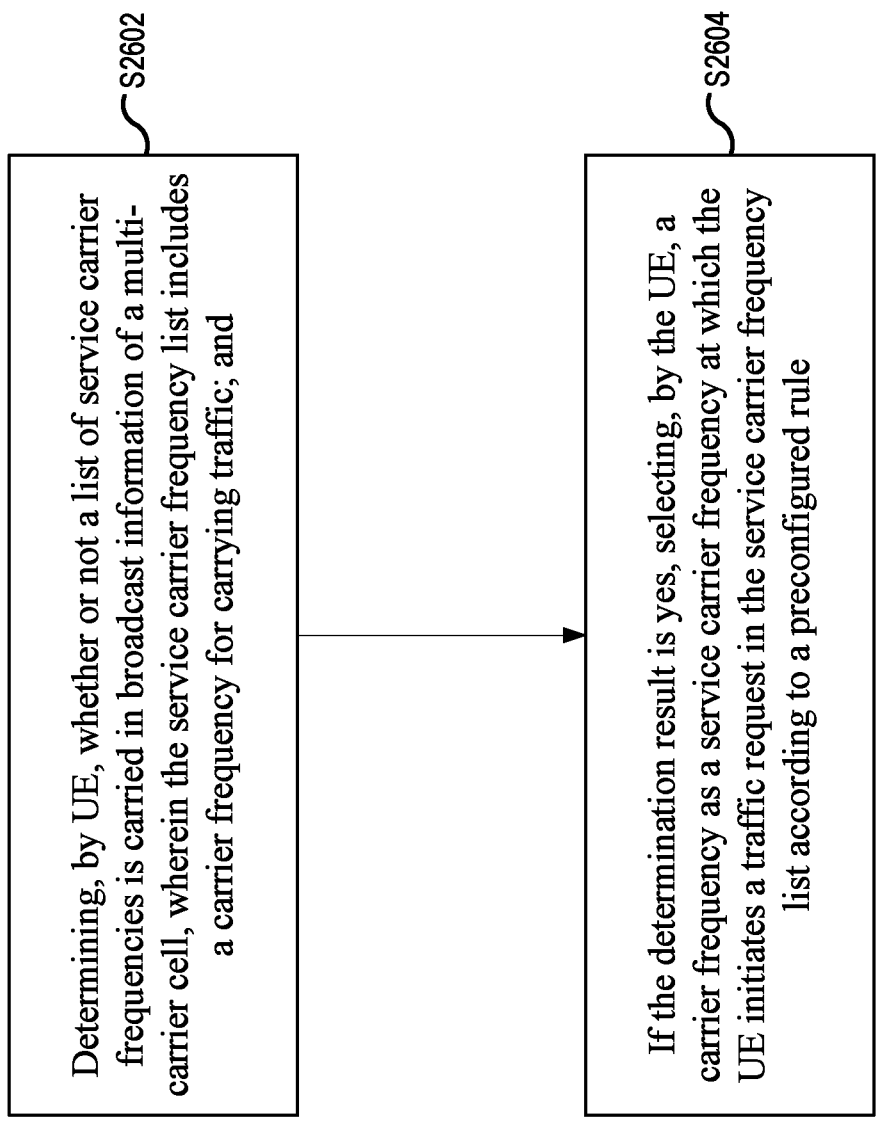
FIG. 26 is a flow chart of yet a carrier frequency selecting method III according to an embodiment of the disclosed technologies.

In the present embodiment, provided is a carrier frequency selecting method. FIG. 26 is a flow chart of yet the carrier frequency selecting method III according to the embodiment of the disclosed technologies. As shown in FIG. 26, the method comprises:

step S2602, in which UE determines whether a service carrier frequency list is carried in broadcast information of a multi-carrier cell, wherein the service carrier frequency list includes a carrier frequency for carrying traffic; and step S2604, in which if the determination result is yes the UE selects a carrier frequency as a service carrier frequency at which the UE initiates a traffic request in the service carrier frequency list according to a preconfigured rule.

With the above steps, a base station carries a service carrier frequency list in broadcast information, and the UE selects a service carrier frequency according to a predefined rule based on the service carrier frequency list in the broadcast information and initiates traffic request when UE triggers traffic access request in a multi-carrier cell, so that a carrier frequency for the UE may be a carrier frequency selected by the base station actively. Thus, the problem that a service carrier frequency selecting strategy in related techniques is to perform selection passively and lacks initiative is solved, and a technical basis for balancing loads on carrier frequencies carrying traffic is provided and further system efficiency is enhanced for an NB-IoT system, which is mainly to transmit small data.

As a preferred embodiment, a subsequent service flow may be performed on the service carrier frequency specified in accordance with the above method if UE receives the information specifying a service carrier frequency given in the above embodiment, while a service carrier frequency may be selected according to the preconfigured rule given in the present embodiment and a subsequent service flow may be performed at the service carrier frequency if the UE does not receive the information specifying a service carrier frequency given in the above embodiment.

Alternatively, the UE monitors a carrier frequency carrying a broadcast channel and receives broadcast information, wherein the broadcast information carries a list of carrier frequencies that can carry traffic message. The UE selects one of the carrier frequencies as a carrier frequency carrying traffic according to a pre-defined rule to initiate a random access request and performs subsequent service transmission and reception at the carrier frequency. The predefined rule may be a method of determining a service carrier frequency based on an ID of the UE and a mod operation of the number of service carrier frequencies, or the like.

A specific method is as follows: in step S2604, the UE acquires a carrier frequency index for a carrier frequency at which the UE initiates traffic request according to the preconfigured rule, and determines a corresponding carrier frequency at which the UE initiates traffic request according to the carrier frequency index. Alternatively, the UE acquires the carrier frequency index according to an identity of the UE and a mod operation of a number of carrier frequencies at which the UE initiates traffic request.

Figure 27:
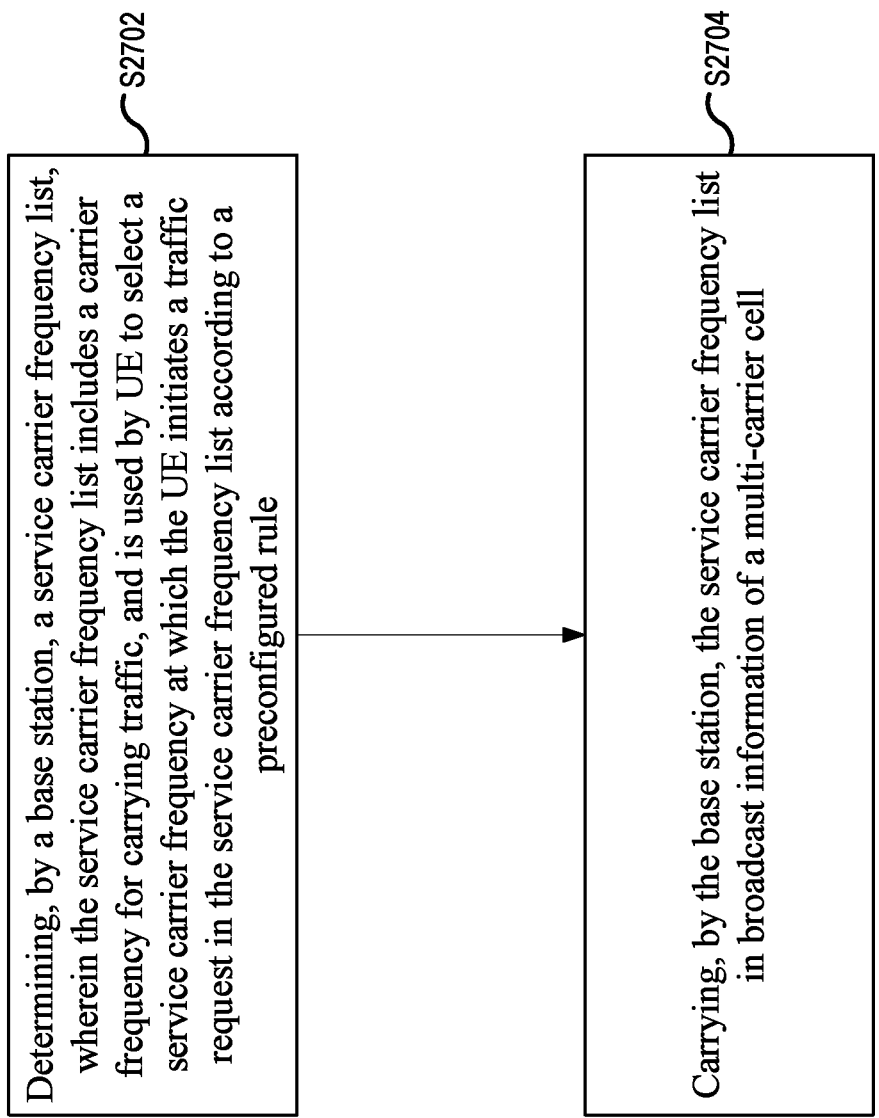
FIG. 27 is a flow chart of yet a carrier frequency selecting method IV according to an embodiment of the disclosed technologies.

In the present embodiment, provided is a carrier frequency selecting method. FIG. 27 is a flow chart of yet the carrier frequency selecting method IV according to the embodiment of the disclosed technologies. As shown in FIG. 27, the method comprises:

step S2702, in which a base station determines a service carrier frequency list, wherein the service carrier frequency list includes a carrier frequency for carrying traffic, and is used by UE to select a service carrier frequency at which the UE initiates traffic request in the service carrier frequency list according to a preconfigured rule; and step S2704, in which the base station carries the service carrier frequency list in broadcast information of a multi-carrier cell.

As a preferred embodiment, a subsequent service flow may be performed on the service carrier frequency specified in accordance with the above method if UE receives the information specifying a service carrier frequency given in the above embodiment, while a service carrier frequency may be selected according to the preconfigured rule given in the present embodiment and a subsequent service flow may be performed at the service carrier frequency if the UE does not receive the information specifying a service carrier frequency given in the above embodiment.

The following description will be made with reference to preferred embodiments. The following preferred embodiments combine the above embodiments and preferred embodiments thereof. In following preferred embodiments, provided are a method and apparatus for load balancing between carrier frequencies in a multi-carrier cell. A specific strategy of the method is as follows:

When an eNodeB receives an RRC connection setup request or an RRC connection resume request, the eNodeB selects a carrier frequency carrying traffic in the multi-carrier cell according to a load situation in the multi-carrier cell, carries information for the carrier frequency in an RRC connection setup message or an RRC connection resume message and transmits it to the UE if a target cell carrying UE is a multi-carrier cell; and After receiving the RRC connection setup message or the RRC connection resume message, the UE performs data reception and transmission at the service carrier frequency subsequently if information for a service carrier frequency is carried in the RRC connection setup message or the RRC connection resume message, while the UE performs subsequent service reception and transmission at an original camped carrier frequency if information for a service carrier frequency is not carried in the RRC connection setup message or the RRC connection resume message.

Alternatively, UE's residing at a carrier frequency carrying a broadcast channel in an IDLE mode is implemented as follows:

1. when performing initial selection in a cell, the UE can monitor only a carrier frequency where a broadcast channel is, so it can only choose to operate at the carrier frequency carrying the broadcast channel;

2. when performing reselection in the cell, implementation is made through a broadcast information configuration strategy; specifically, in configuration of broadcast information, an adjacent carrier frequency is based on a carrier frequency carrying a broadcast channel; in this way, the UE will automatically reselect the carrier frequency carrying a broadcast channel when performing reselection;

3. when the UE is switched from an RRC connection state to the IDLE mode, it is specified that the UE operates at a carrier frequency carrying a broadcast channel; the specific implementation is as follows: if an RRC release message or an RRC connection suspension message carries a redirecting information element, information for a carrier frequency in the redirecting information element can be filled in with only information corresponding to a carrier frequency carrying a broadcast channel, so that the UE operates at the carrier frequency carrying a broadcast channel; and, if a redirecting information element is not carried in an RRC release message or an RRC connection suspension message, the UE automatically operates at a carrier frequency carrying a broadcast channel and a synchronization channel of a current cell after release. Further, a carrier frequency carrying a broadcast channel in a cell can be acquired from SIB information or RRC signaling.

With the above method, a technical problem that can be solved is proposing a method and apparatus for load balancing between carrier frequencies in multi-carrier cell, which can achieve load balancing between the carrier frequencies in the multi-carrier cell.

The method and apparatus for load balancing between carrier frequencies in a multi-carrier cell given in the present preferred embodiments will be described in further detail with reference to the drawings.

In a following preferred embodiment, an example of a multi-carrier cell is provided. In the preferred embodiment, the multi-carrier cell includes the following five carrier frequencies:

a first carrier that can serve as a carrier for an IDLE mode, and is provided with a broadcast channel (PBCH), a synchronization channel (PSS/SSS), a cell reference channel (CRS), and a traffic channel (PDCCH/PDSCH); and, second, third, fourth and fifth carrier frequencies that can only serve as carrier frequencies carrying traffic and are thus provided with only a cell reference channel (CRS), and a traffic channel (PDCCH/PDSCH).

Embodiment I

Figure 13:
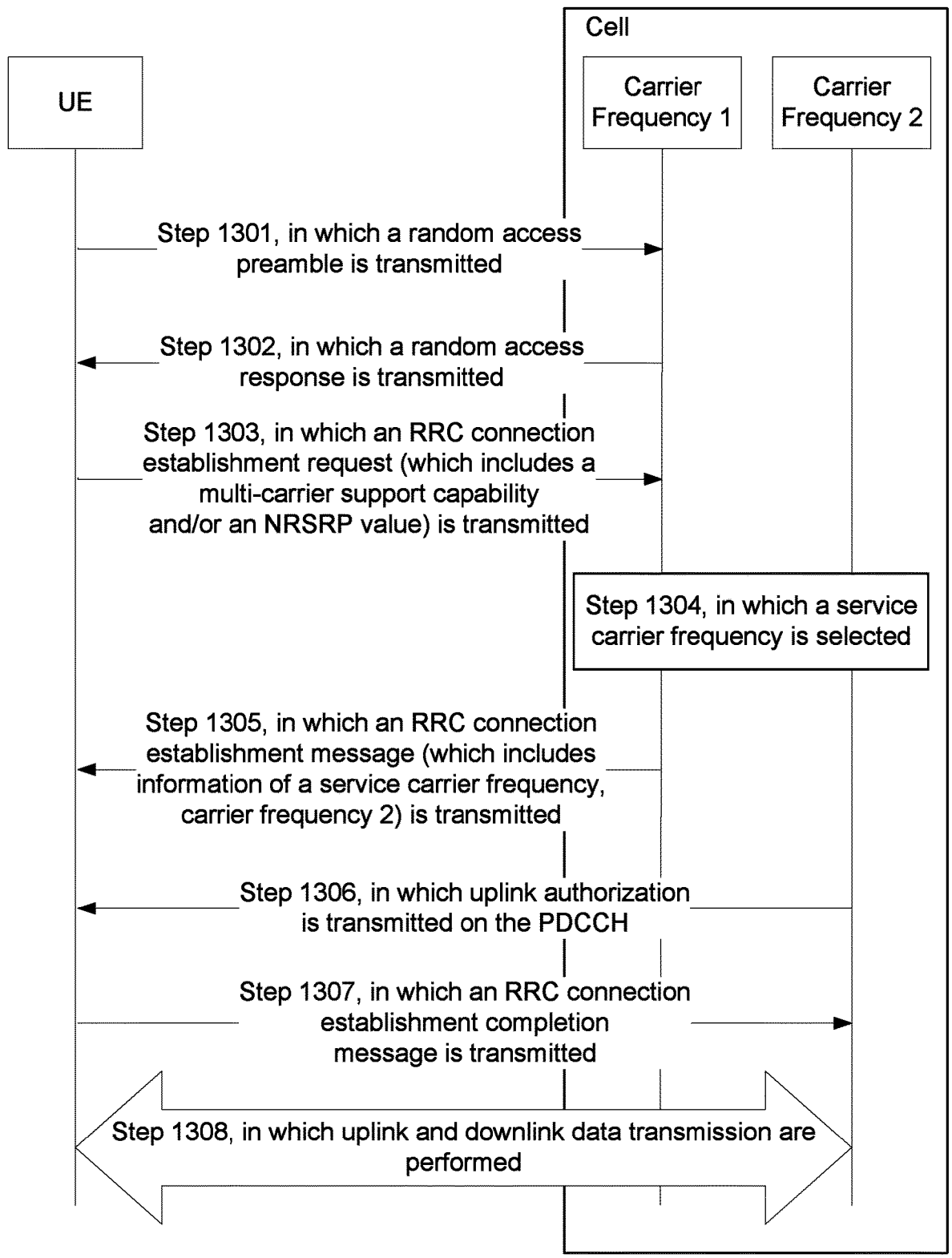
FIG. 13 is a flow chart of embodiment I of the disclosed technologies.

FIG. 13 is a flow chart of embodiment I of the disclosed technologies. This embodiment explains a process of balancing loads between carrier frequencies in a multi-carrier cell when an RRC connection is established.

Step 1301: UE transmits a random access preamble to carrier frequency 1 of the multi-carrier cell.

Step 1302: carrier frequency 1 transmits a random access response to the UE.

Step 1303: the UE transmits an RRC connection setup request, which includes information for a multi-carrier support capability of the UE and/or an NRSRP value, to carrier frequency 1 of the multi-carrier cell.

Step 1304: a base station of the multi-carrier cell selects a service carrier frequency.

Step 1305: carrier frequency 1 transmits an RRC connection setup message, which includes that information for a service carrier frequency is carrier frequency 2, to the UE.

Alternatively, the RRC connection setup message contains information for transmission power of an NRS of carrier frequency 2, and the information for transmission power of an NRS of carrier frequency 2 may be an absolute value (in the unit of dBm) of the transmission power of the NRS of carrier frequency 2, or a relative value (in the unit of dB or %) of the transmission power relative to transmission power of an Anchor carrier (carrier frequency 1).

The information for transmission power of an NRS of carrier frequency 2 provides Energy Per Resource Element of the NRS of carrier frequency 2 to be used by the UE to perform an RSRP measurement and/or path loss calculation when the UE is assigned to carrier frequency 2.

Step 1306: carrier frequency 2 transmits uplink grant to the UE on the PDCCH.

Step 1307: the UE transmits an RRC connection setup completion message to carrier frequency 2.

Step 1308: the UE performs uplink and downlink data transmission at carrier frequency 2.

Embodiment II

Figure 14:
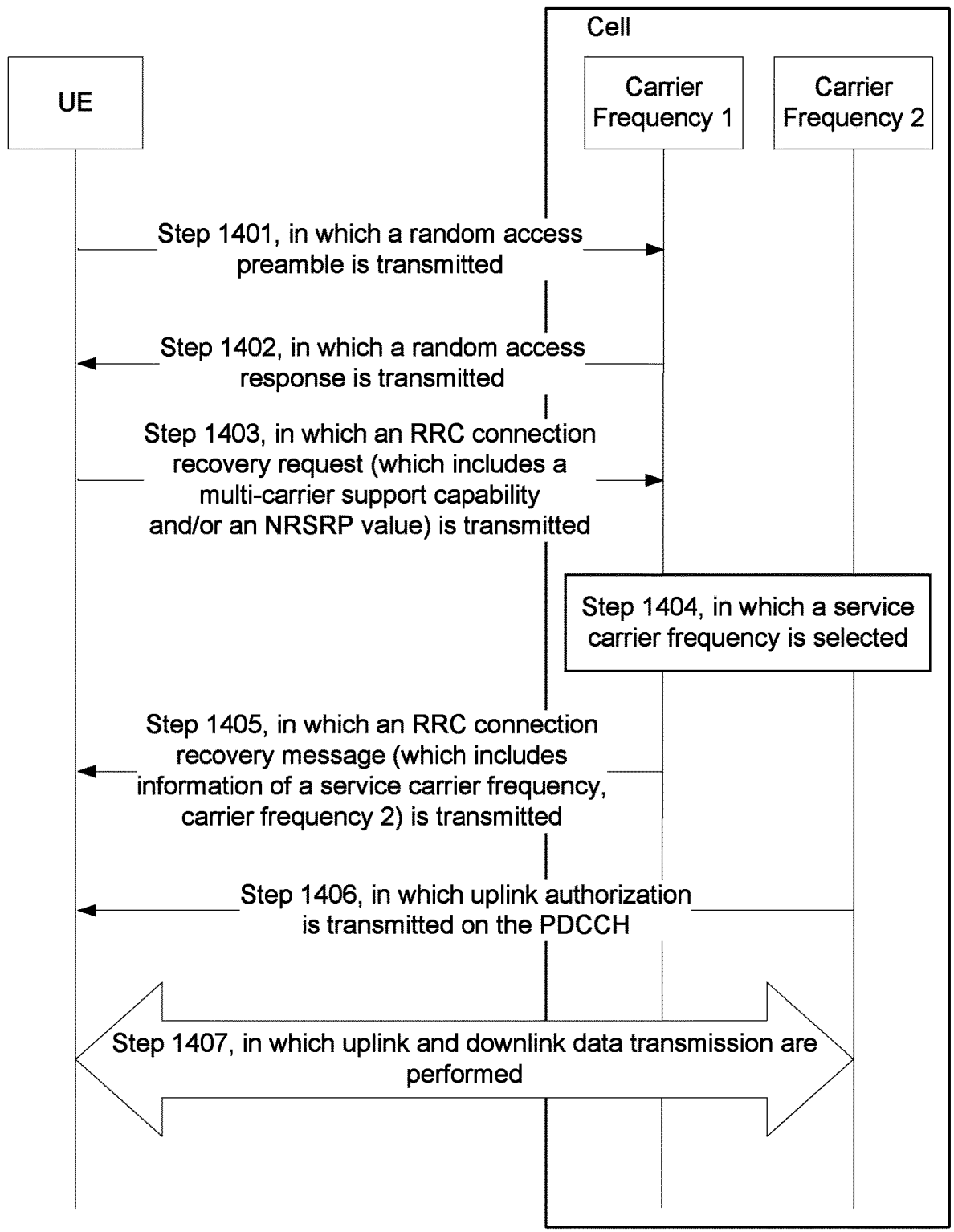
FIG. 14 is a flow chart of embodiment II of the disclosed technologies.

FIG. 14 is a flow chart of embodiment II of the disclosed technologies. This embodiment explains a process of balancing loads between carrier frequencies in a multi-carrier cell when an RRC connection is recovered.

Step 1401: UE transmits a random access preamble to carrier frequency 1 of the multi-carrier cell.

Step 1402: carrier frequency 1 transmits a random access response to the UE.

Step 1403: the UE transmits an RRC connection resume request, which includes information for a multi-carrier support capability of the UE and/or an NRSRP value, to carrier frequency 1 of the multi-carrier cell.

Step 1404: a base station of the multi-carrier cell selects a service carrier frequency.

Step 1405: carrier frequency 1 transmits an RRC connection resume message, which includes that information for a service carrier frequency is carrier frequency 2, to the UE.

Alternatively, the RRC connection resume message contains information for transmission power of an NRS of carrier frequency 2, and the information for transmission power of an NRS of carrier frequency 2 may be an absolute value (in the unit of dBm) of the transmission power of the NRS of carrier frequency 2, or a relative value (in the unit of dB or %) of the transmission power relative to transmission power of an Anchor carrier (carrier frequency 1).

The information for transmission power of an NRS of carrier frequency 2 provides Energy Per Resource Element of the NRS of carrier frequency 2 to be used by the UE to perform an RSRP measurement and/or path loss calculation when the UE is assigned to carrier frequency 2.

Step 1406: carrier frequency 2 transmits uplink grant to the UE on the PDCCH.

Step 1407: the UE performs uplink and downlink data transmission at carrier frequency 2.

Implementation where a message carrying information of a service carrier frequency sent by a carrier to UE may also be an RRC connection reestablishment message or an RRC connection reconfiguration message is similar to those of embodiments I and II and thus will not repeated herein.

Embodiment III

Figure 15:
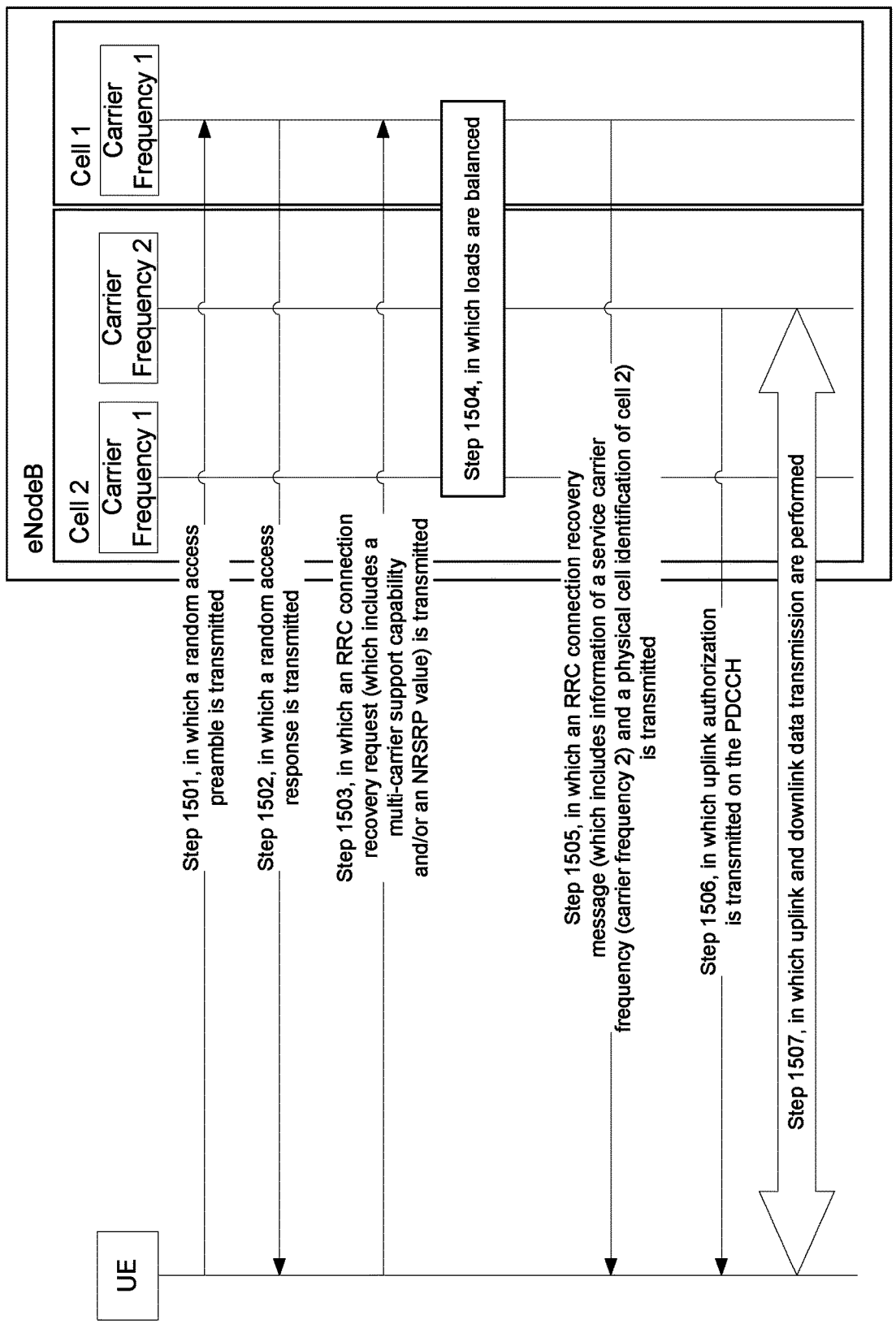
FIG. 15 is a flow chart of embodiment III of the disclosed technologies.

FIG. 15 is a flow chart of embodiment III of the disclosed technologies. This embodiment explains a process of balancing loads from other cell to a multi-carrier cell when an RRC connection is established.

Step 1501: UE transmits a random access preamble to carrier frequency 1 of cell 1.

Step 1502: carrier frequency 1 of cell 1 transmits a random access response to the UE.

Step 1503: the UE transmits an RRC connection setup request, which includes information for a multi-carrier support capability of the UE and/or an NRSRP value, to carrier frequency 1 of cell 1.

Step 1504: a base station of the multi-carrier cell balances the loads.

Step 1505: carrier frequency 1 of cell 1 transmits an RRC connection setup message, which includes information of a service carrier frequency (e.g., carrier frequency 2) and a physical cell identification of cell 2, to the UE.

Alternatively, the connection setup message contains information for transmission power of an NRS of carrier frequency 2, and the information for transmission power of an NRS of carrier frequency 2 is an absolute value (in the unit of dBm) of the transmission power of the NRS of carrier frequency 2.

The information for transmission power of an NRS of carrier frequency 2 provides Energy Per Resource Element of the NRS of carrier frequency 2 to be used by the UE to perform an RSRP measurement and/or path loss calculation when the UE is assigned to carrier frequency 2.

Step 1506: carrier frequency 2 of cell 2 transmits uplink grant to the UE on the PDCCH.

Step 1507: the UE performs uplink and downlink data transmission at carrier frequency 2 of cell 2.

Embodiment IV

Figure 16:
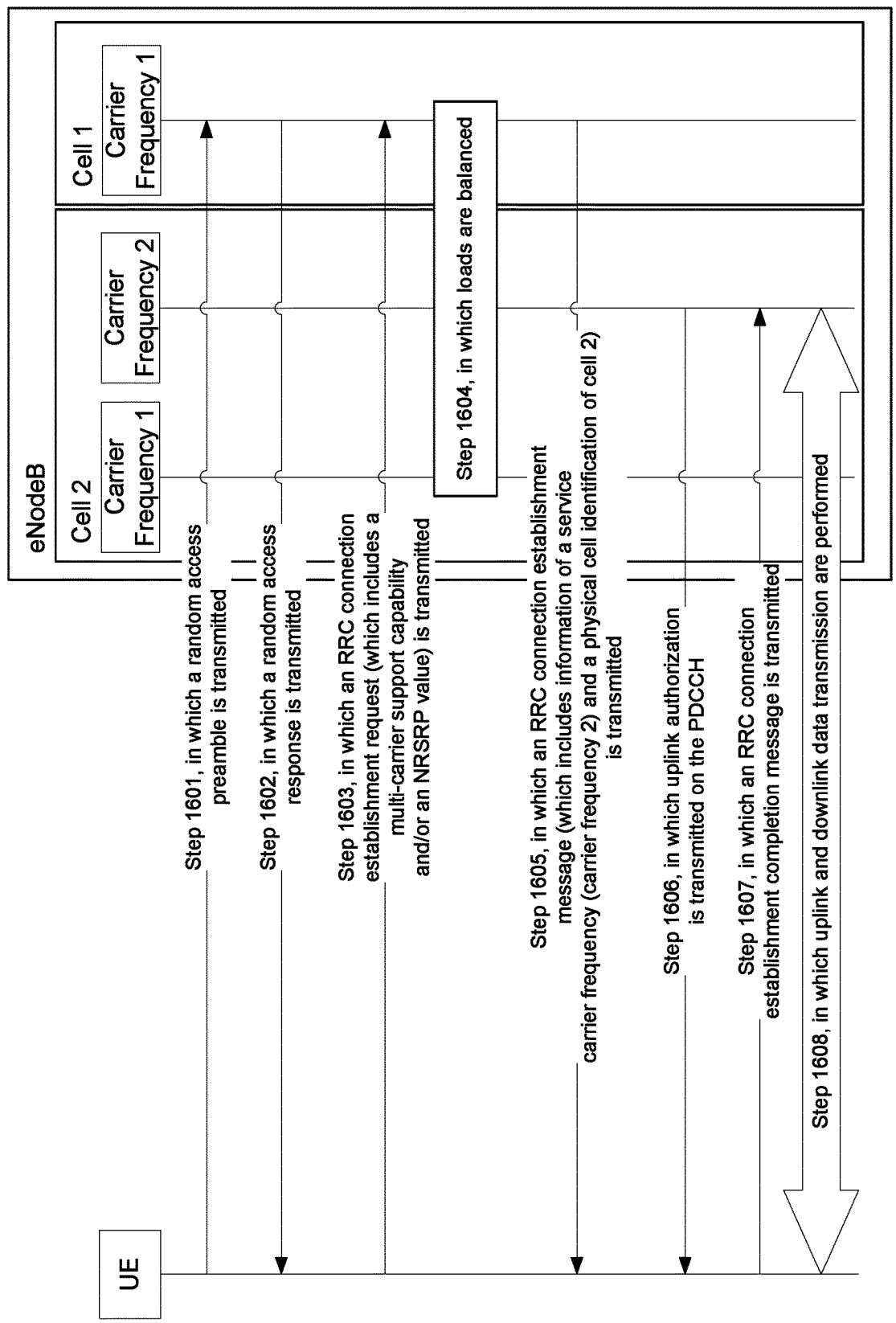
FIG. 16 is a flow chart of embodiment IV of the disclosed technologies.

FIG. 16 is a flow chart of embodiment IV of the disclosed technologies. This embodiment explains a process of balancing loads from other cell to a multi-carrier cell when an RRC connection is recovered.

Step 1601: UE transmits a random access preamble to carrier frequency 1 of cell 1.

Step 1602: carrier frequency 1 of cell 1 transmits a random access response to the UE.

Step 1603: the UE transmits an RRC connection resume request, which includes information for a multi-carrier support capability of the UE and/or an NRSRP value, to carrier frequency 1 of cell 1.

Step 1604: a base station of the multi-carrier cell balances the loads.

Step 1605: carrier frequency 1 of cell 1 transmits an RRC connection resume message, which includes information for a service carrier frequency (e.g., carrier frequency 2) and a physical cell identification of cell 2, to the UE.

Alternatively, the RRC connection resume message contains information for transmission power of an NRS of carrier frequency 2, and the information for transmission power of an NRS of carrier frequency 2 is an absolute value (in the unit of dBm) of the transmission power of the NRS of carrier frequency 2.

The information for transmission power of an NRS of carrier frequency 2 provides Energy Per Resource Element of the NRS of carrier frequency 2 to be used by the UE to perform an RSRP measurement and/or path loss calculation when the UE is assigned to carrier frequency 2.

Step 1606: carrier frequency 2 of cell 2 transmits uplink grant to the UE on the PDCCH.

Step 1607: the UE transmits an RRC connection setup completion message to carrier frequency 2 of cell 2.

Step 1608: the UE performs uplink and downlink data transmission at carrier frequency 2 of cell 2.

Implementation where a message carrying information for a service carrier frequency sent by a carrier to UE may also be an RRC connection reestablishment message or an RRC connection reconfiguration message is similar to those of embodiments I and II and thus will not repeated herein.

Embodiment V

Figure 17:
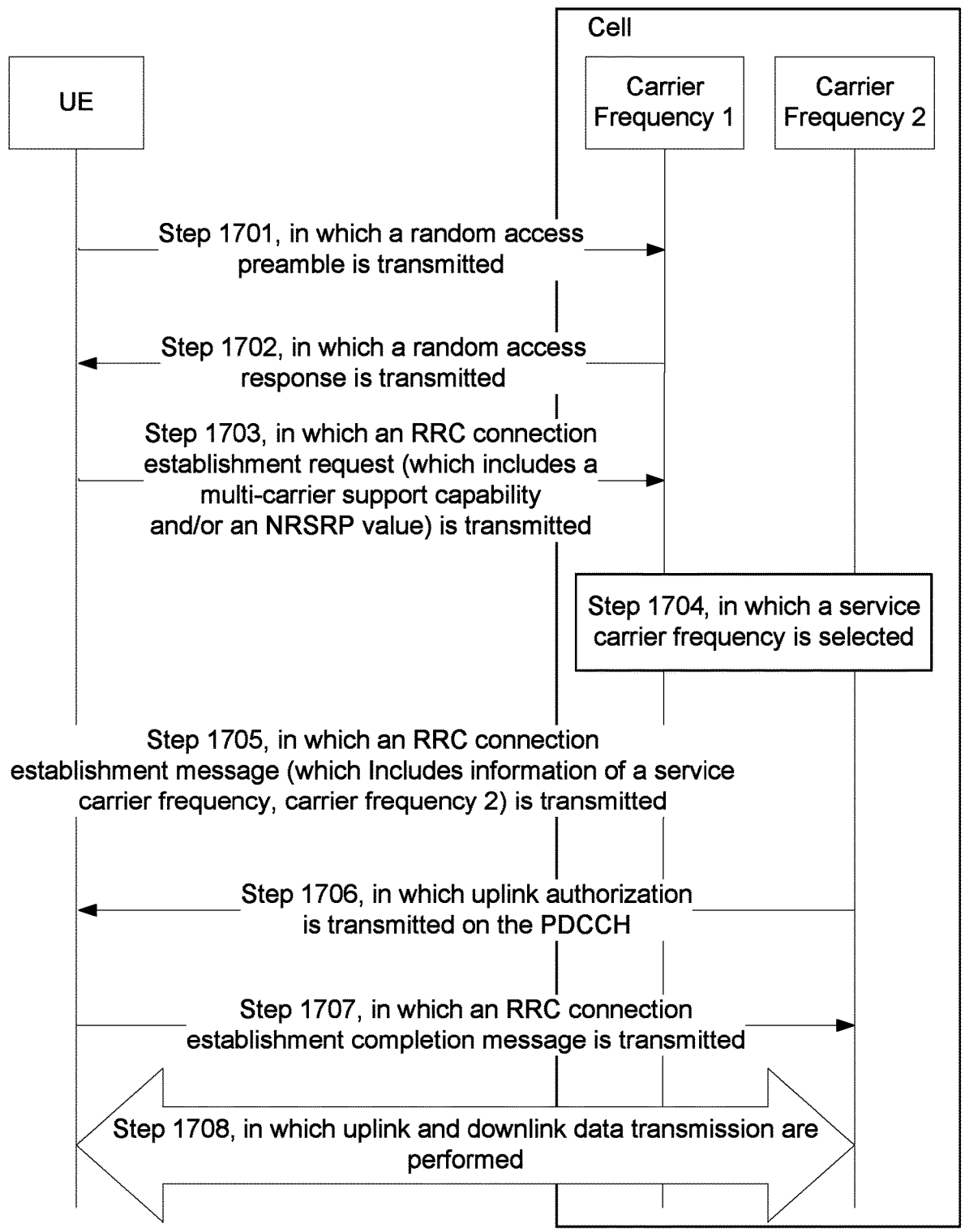
FIG. 17 is a flow chart of embodiment V of the disclosed technologies.

FIG. 17 is a flow chart of embodiment V of the disclosed technologies. This embodiment explains a process of balancing loads between carrier frequencies in a multi-carrier cell when an RRC connection is to be recovered and an eNodeB cannot find context of UE and thus triggers setup of an RRC connection.

Step 1701: UE transmits a random access preamble to carrier frequency 1 of the multi-carrier cell.

Step 1702: carrier frequency 1 transmits a random access response to the UE.

Step 1703: the UE transmits an RRC connection setup request, which includes information for a multi-carrier support capability of the UE and/or an NRSRP value, to carrier frequency 1 of the multi-carrier cell.

Step 1704: a base station of the multi-carrier cell selects a service carrier frequency.

Step 1705: carrier frequency 1 transmits an RRC connection setup message, which includes that information of a service carrier frequency (carrier frequency 2), to the UE.

Alternatively, the RRC connection setup message contains information for transmission power of an NRS of carrier frequency 2, and the information for transmission power of an NRS of carrier frequency 2 may be an absolute value (in the unit of dBm) of the transmission power of the NRS of carrier frequency 2, or a relative value (in the unit of dB or %) of the transmission power relative to transmission power of an Anchor carrier (carrier frequency 1).

The information for transmission power of an NRS of carrier frequency 2 provides Energy Per Resource Element of the NRS of carrier frequency 2 to be used by the UE to perform an RSRP measurement and/or path loss calculation when the UE is assigned to carrier frequency 2.

Step 1706: carrier frequency 2 transmits uplink grant to the UE on the PDCCH.

Step 1707: the UE transmits an RRC connection setup completion message to carrier frequency 2.

Step 1708: the UE performs uplink and downlink data transmission at carrier frequency 2.

Embodiment VI

Figure 18:
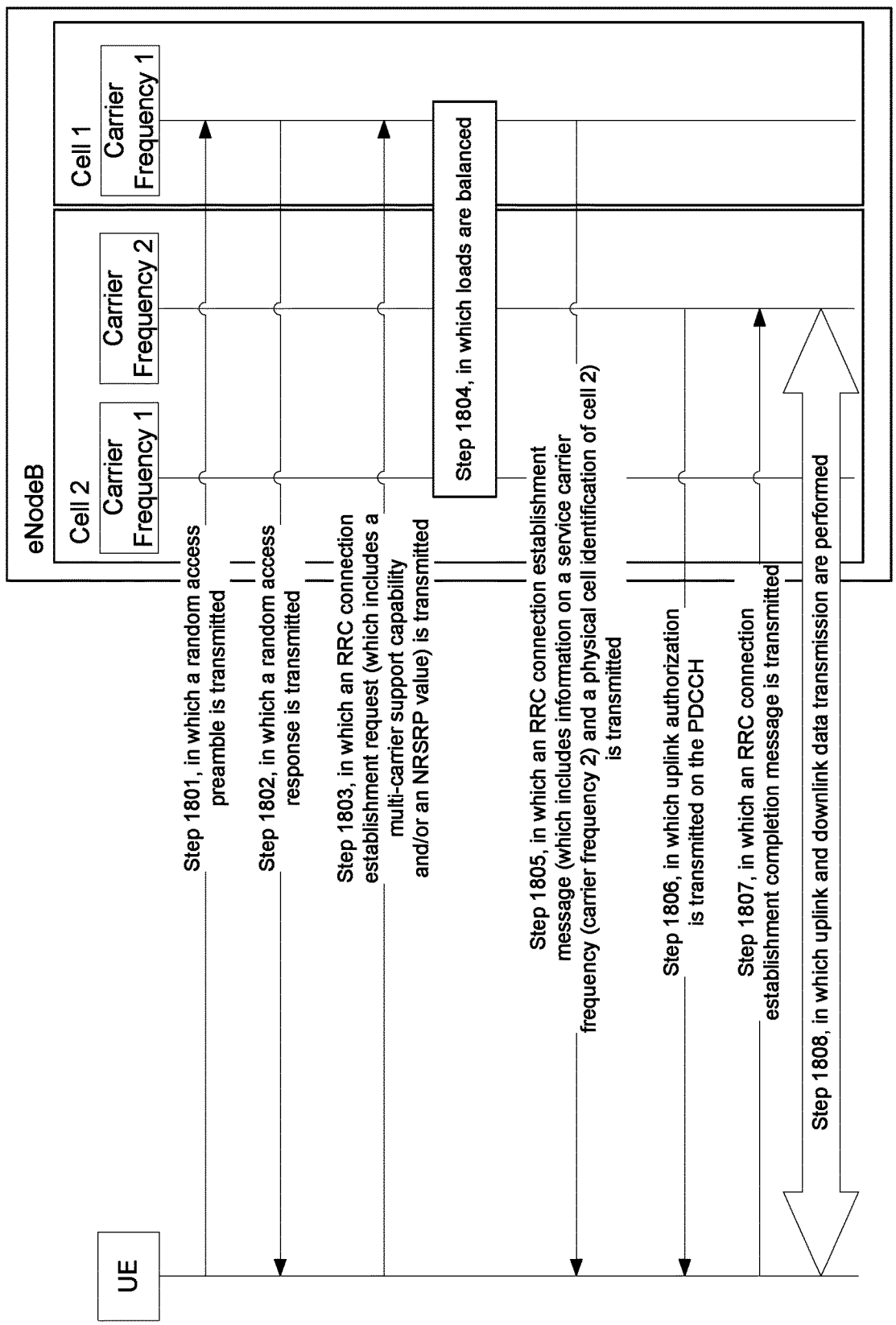
FIG. 18 is a flow chart of embodiment VI of the disclosed technologies.

FIG. 18 is a flow chart of embodiment VI of the disclosed technologies. This embodiment explains a process of balancing loads from carrier frequencies in a multi-carrier cell to carrier frequencies in other multi-carrier cell when an RRC connection is to be recovered and an eNodeB cannot find context of UE and thus triggers setup of an RRC connection.

Step 1801: UE transmits a random access preamble to carrier frequency 1 of cell 1.

Step 1802: carrier frequency 1 of cell 1 transmits a random access response to the UE.

Step 1803: the UE transmits an RRC connection setup request, which includes information for a multi-carrier support capability of the UE and/or an NRSRP value, to carrier frequency 1 of cell 1.

Step 1804: a base station of the multi-carrier cell balances the loads.

Step 1805: carrier frequency 1 of cell 1 transmits an RRC connection setup message, which includes information of a service carrier frequency (e.g., carrier frequency 2) and a physical cell identification of cell 2, to the UE.

Alternatively, the RRC connection setup message contains information for transmission power of an NRS of carrier frequency 2, and the information for transmission power of an NRS of carrier frequency 2 may be an absolute value (in the unit of dBm) of the transmission power of the NRS of carrier frequency 2.

The information for transmission power of an NRS of carrier frequency 2 provides Energy Per Resource Element of the NRS of carrier frequency 2 to be used by the UE to perform an RSRP measurement and/or path loss calculation when the UE is assigned to carrier frequency 2.

Step 1806: carrier frequency 2 of cell 2 transmits uplink grant to the UE on the PDCCH.

Step 1807: the UE transmits an RRC connection setup completion message to carrier frequency 2 of cell 2.

Step 1808: the UE performs uplink and downlink data transmission at carrier frequency 2 of cell 2.

Implementation where a message carrying information for a service carrier frequency sent by a carrier to UE may also be an RRC connection reestablishment message or an RRC connection reconfiguration message is similar to those of embodiments I and II and thus will not repeated herein.

Embodiment VII

Figure 19:
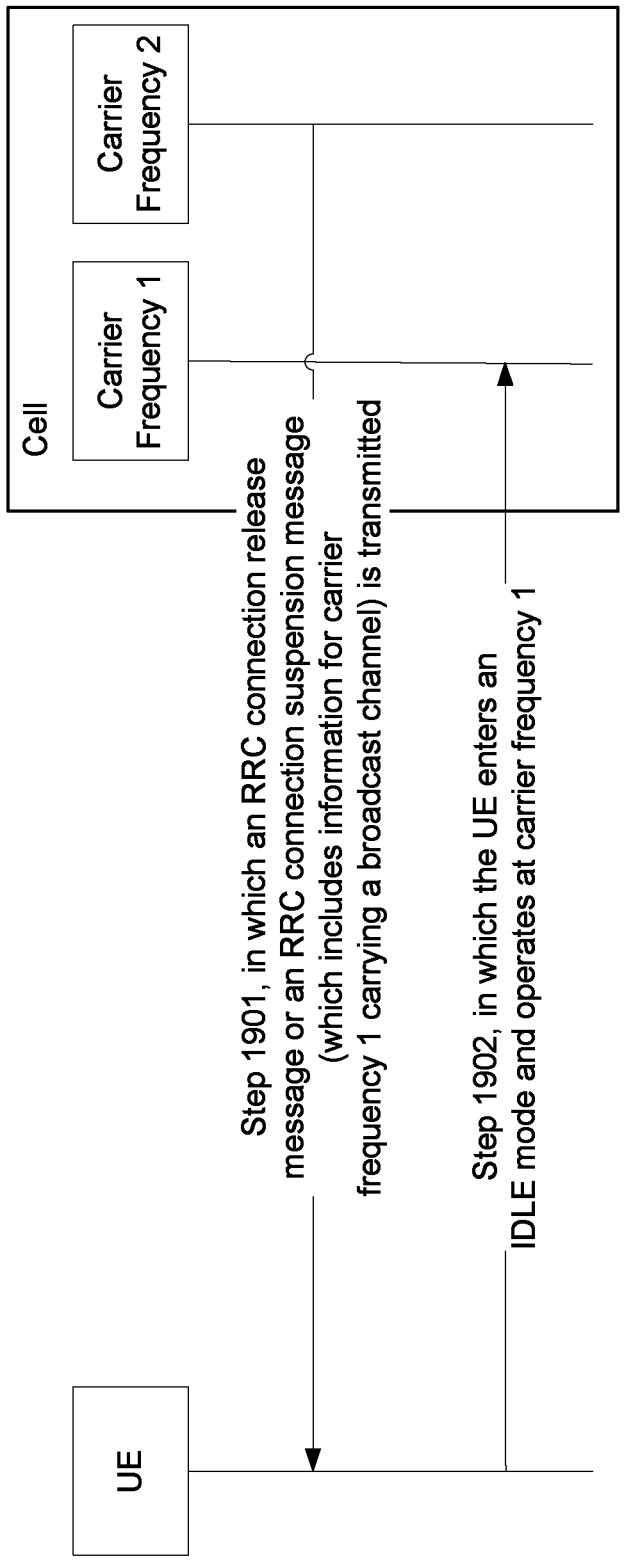
FIG. 19 is a flow chart of embodiment VII of the disclosed technologies.

FIG. 19 is a flow chart of embodiment VII of the disclosed technologies. This embodiment explains a process that information for a carrier carrying a broadcast channel is carried in an RRC release message or an RRC connection suspension message to guide the UE to operate at the carrier carrying a broadcast channel.

In step 1901, carrier frequency 2 transmits an RRC connection release message or an RRC connection suspension message, which includes information for carrier frequency 1 carrying a broadcast channel, to the UE.

In step 1902, the UE enters an IDLE mode and operates at carrier frequency 1.

Embodiment VIII

Figure 20:
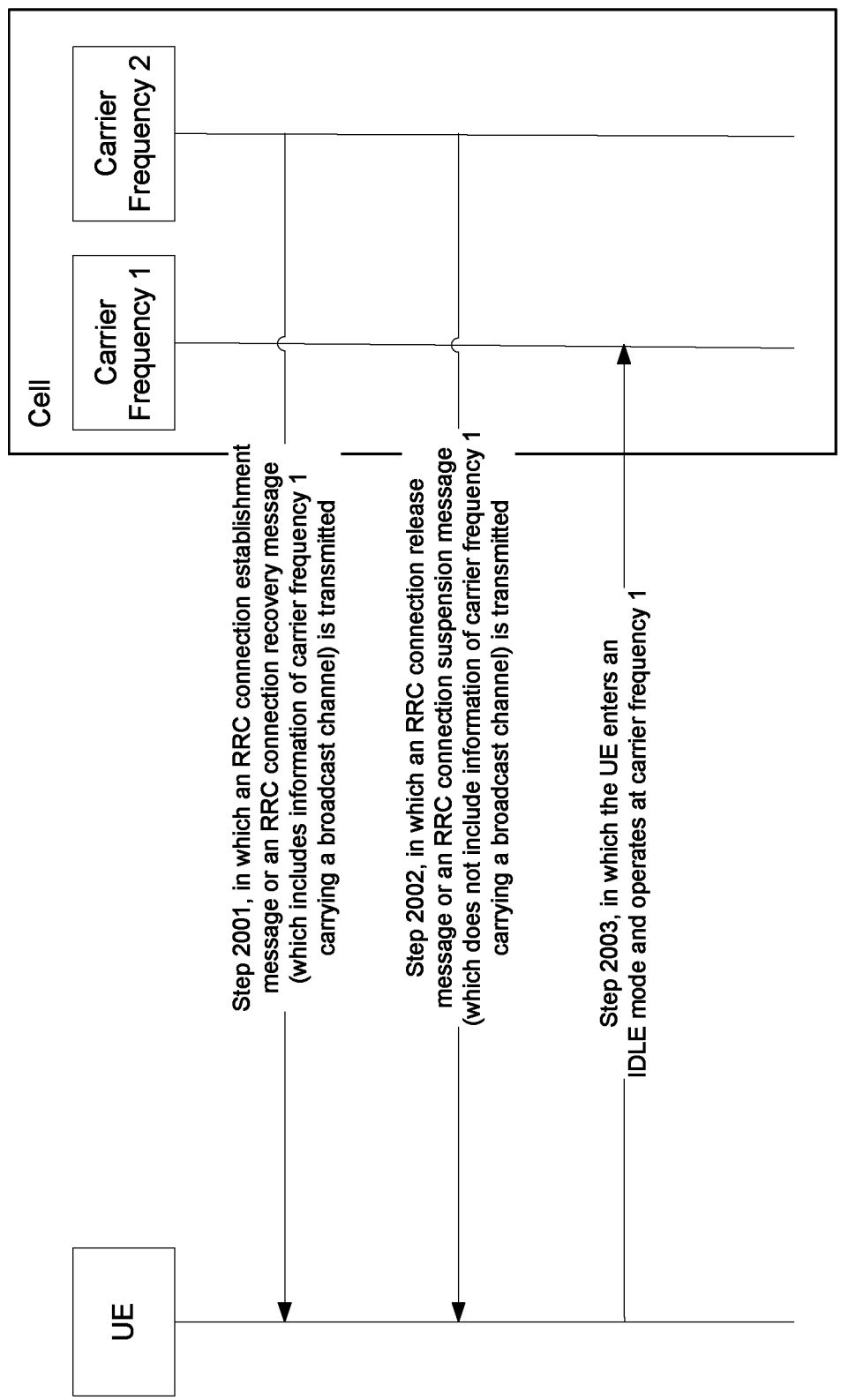
FIG. 20 is a flow chart of embodiment VIII of the disclosed technologies.

FIG. 20 is a flow chart of embodiment VIII of the disclosed technologies. This embodiment explains a process that information for a carrier carrying a broadcast channel is carried in an RRC connection setup message or an RRC resume completion message but the information for a carrier carrying a broadcast channel is not carried in an RRC release message or an RRC connection suspension message, the UE automatically operates at the carrier carrying a broadcast channel carried in the RRC connection setup or the RRC resume completion message when performing RRC release or RRC connection suspension.

In step 2001, carrier frequency 2 transmits an RRC connection setup message or an RRC connection resume message, which includes information for carrier frequency 1 carrying a broadcast channel, to the UE.

In step 2002, carrier frequency 2 transmits an RRC connection release message or an RRC connection suspension message, which does not include information for carrier frequency 1 carrying a broadcast channel, to the UE.

In step 2003, the UE enters an IDLE mode and operates at carrier frequency 1.

Embodiment IX

Figure 21:
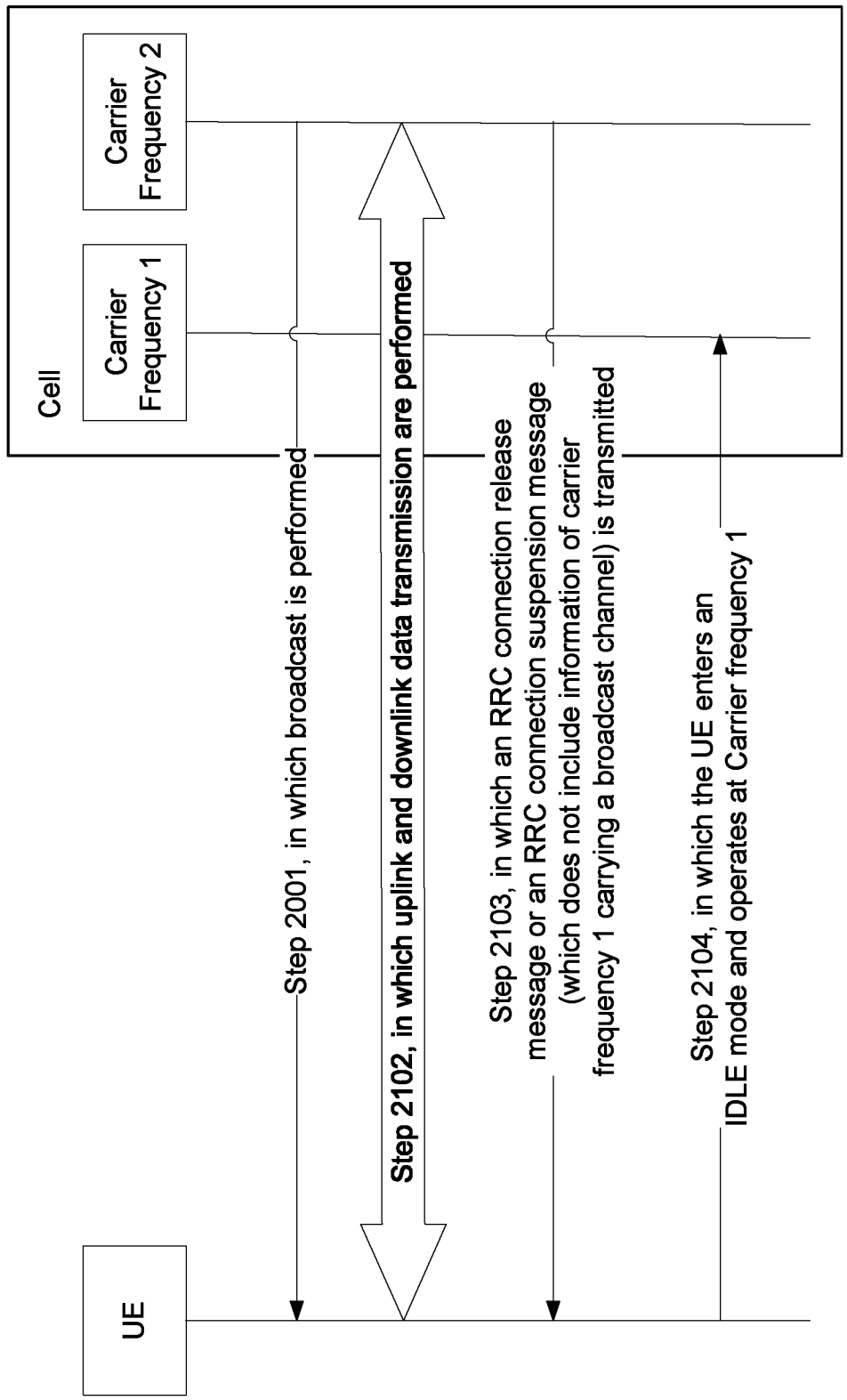
FIG. 21 is a flow chart of embodiment IX of the disclosed technologies.

FIG. 21 is a flow chart of embodiment IX of the disclosed technologies. This embodiment explains a process that information for a carrier carrying a broadcast channel is not carried in an RRC connection setup message or an RRC resume completion message and the information for a carrier carrying a broadcast channel is not carried in an RRC release message or an RRC connection suspension message either, the UE automatically operates at a carrier at which the UE operates in an IDLE mode last time when performing RRC release or RRC connection suspension.

In step 2101, carrier frequency 1 transmits a broadcast message.

In step 2102, carrier frequency 2 and the UE perform uplink and downlink data transmission.

In step 2103, carrier frequency 2 transmits an RRC connection release message or an RRC connection suspension message, which does not include information for carrier frequency 1 carrying a broadcast channel, to the UE.

In step 2104, the UE enters an IDLE mode and operates at carrier frequency 1.

Embodiment X

Figure 22:
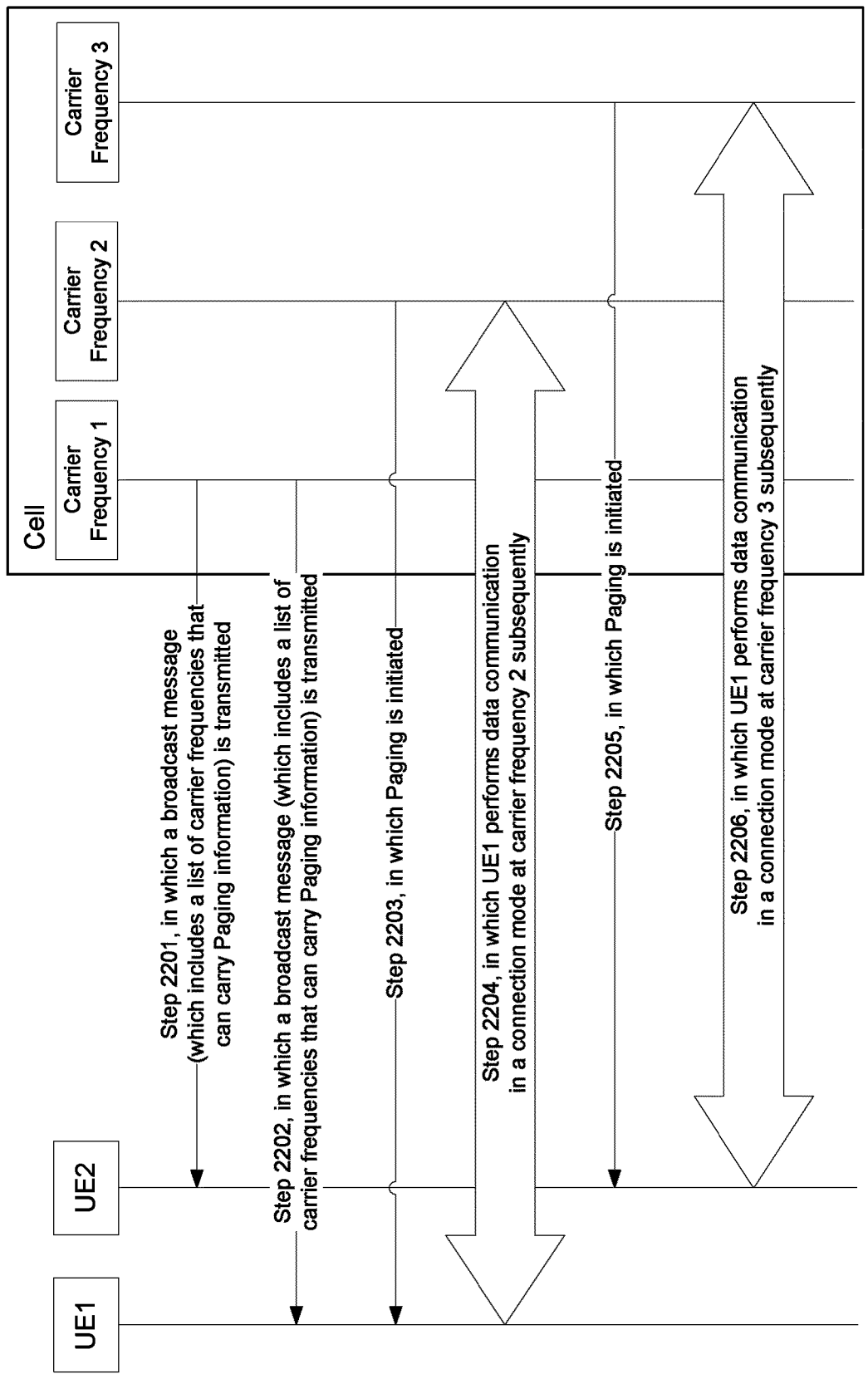
FIG. 22 is a flow chart of embodiment X of the disclosed technologies.

FIG. 22 is a flow chart of embodiment X of the disclosed technologies. This embodiment explains a process that UE carries a list of carrier frequencies that can carry a Paging message in broadcast information of a multi-carrier cell and selects one carrier frequency from the carrier frequencies as a carrier for receiving a Paging message and/or carrying traffic according to a predefined rule.

In step 2201, carrier frequency 1 transmits a broadcast message, which carries a list of carrier frequencies that can carry a Paging message, to UE 1;

In step 2202, carrier frequency 1 transmits a broadcast message, which carries a list of carrier frequencies that can carry a Paging message, to UE 2;

In step 2203, UE 1 determines according to the predefined rule that carrier frequency 2 is to carry Paging and service information of the UE, and the multi-carrier cell initiates Paging to UE 1 via carrier frequency 2.

In step 2204, carrier frequency 2 and UE 1 perform data communication in a connection mode.

In step 2205, UE 2 determines according to the predefined rule that carrier frequency 3 is to carry Paging and service information of the UE, and the multi-carrier cell initiates Paging to UE 2 via carrier frequency 3.

In step 2206, carrier frequency 3 and UE 2 perform data communication in a connection mode.

The predefined rule may be a strategy that a corresponding carrier frequency index may be acquired based on an ID of the UE and a mod operation of the number of carrier frequencies carrying a Paging message, or the like.

The list of carrier frequencies carrying a Paging message may also be a list of all carrier frequencies of the multi-carrier cell, which means that all the carrier frequencies may carry a Paging message.

In an IDLE mode, UE can monitor a carrier frequency carrying a broadcast channel and a carrier frequency carrying its own Paging message in a way of frequency hopping. Specifically, the UE monitors the carrier frequency carrying its own Paging message at a Paging Occasion and at a subsequent Paging message reception phases, and at other times, the UE monitors the carrier frequency carrying a broadcast channel so as to receive system broadcast and maintain synchronization with the network.

Embodiment XI

Figure 23:
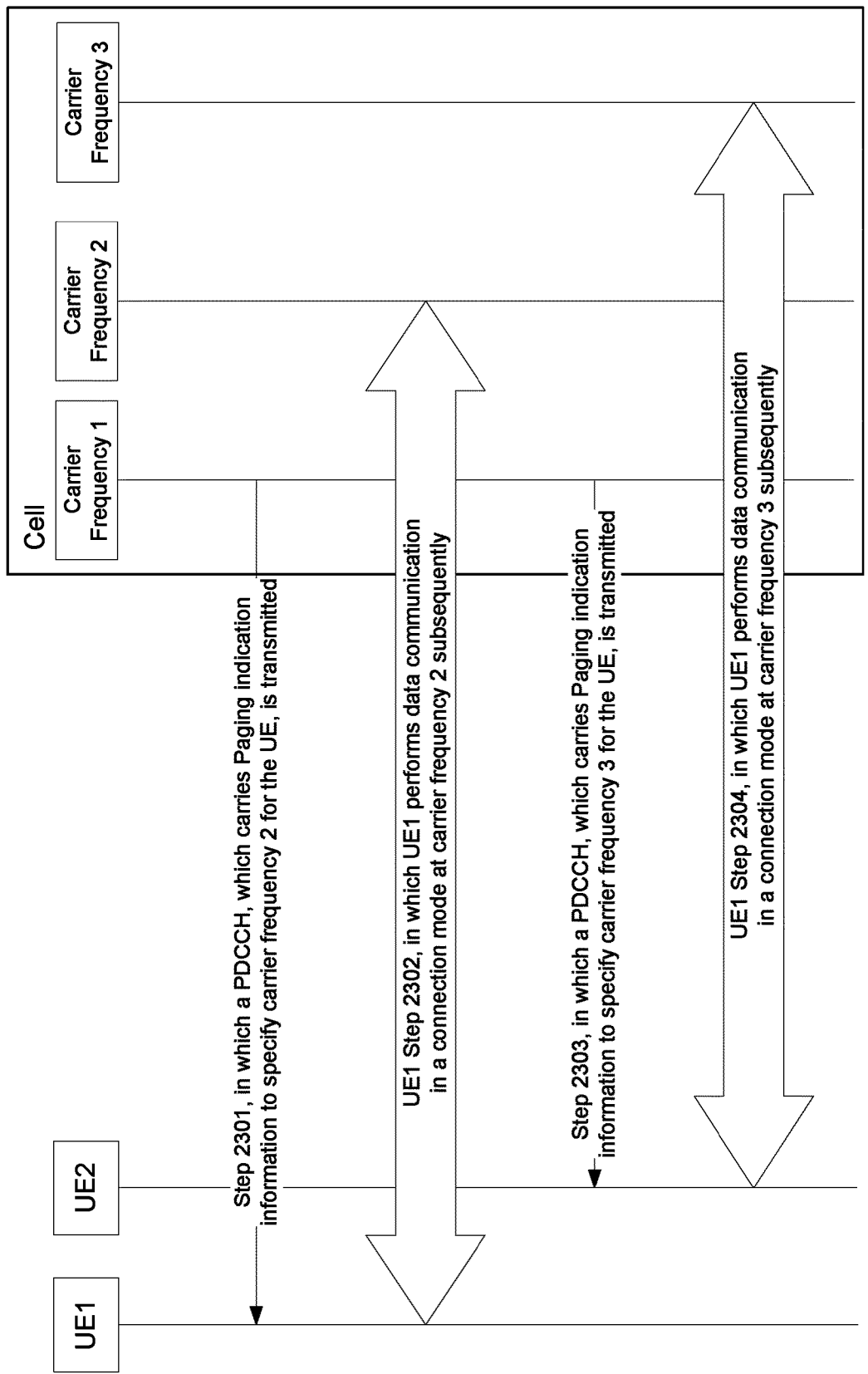
FIG. 23 is a flow chart of embodiment XI of the disclosed technologies.

FIG. 23 is a flow chart of embodiment XI of the disclosed technologies. This embodiment explains a process of transmitting a PDCCH carrying Paging indication information (e.g., P-TMSI) in a multi-carrier cell at a carrier frequency carrying a broadcast channel. The PDCCH carrying Paging indication information (e.g., P-TMSI) indicates a carrier frequency carrying subsequent Paging information and/or a subsequent service, and UE performs reception and transmission of subsequent Paging information and/or a subsequent service at the carrier frequency indicated.

In step 2301, carrier frequency 1 transmits a PDCCH, which carries Paging indication information to specify carrier frequency 2 as a service carrier frequency for the UE, to UE 1.

In step 2302, carrier frequency 2 and UE 1 perform data communication in a connection mode.

In step 2303, carrier frequency 1 transmits a PDCCH, which carries Paging indication information to specify carrier frequency 3 as a service carrier frequency for the UE, to UE 2.

In step 2304, carrier frequency 3 and UE 2 perform data communication in a connection mode.

Embodiment XII

Figure 24:
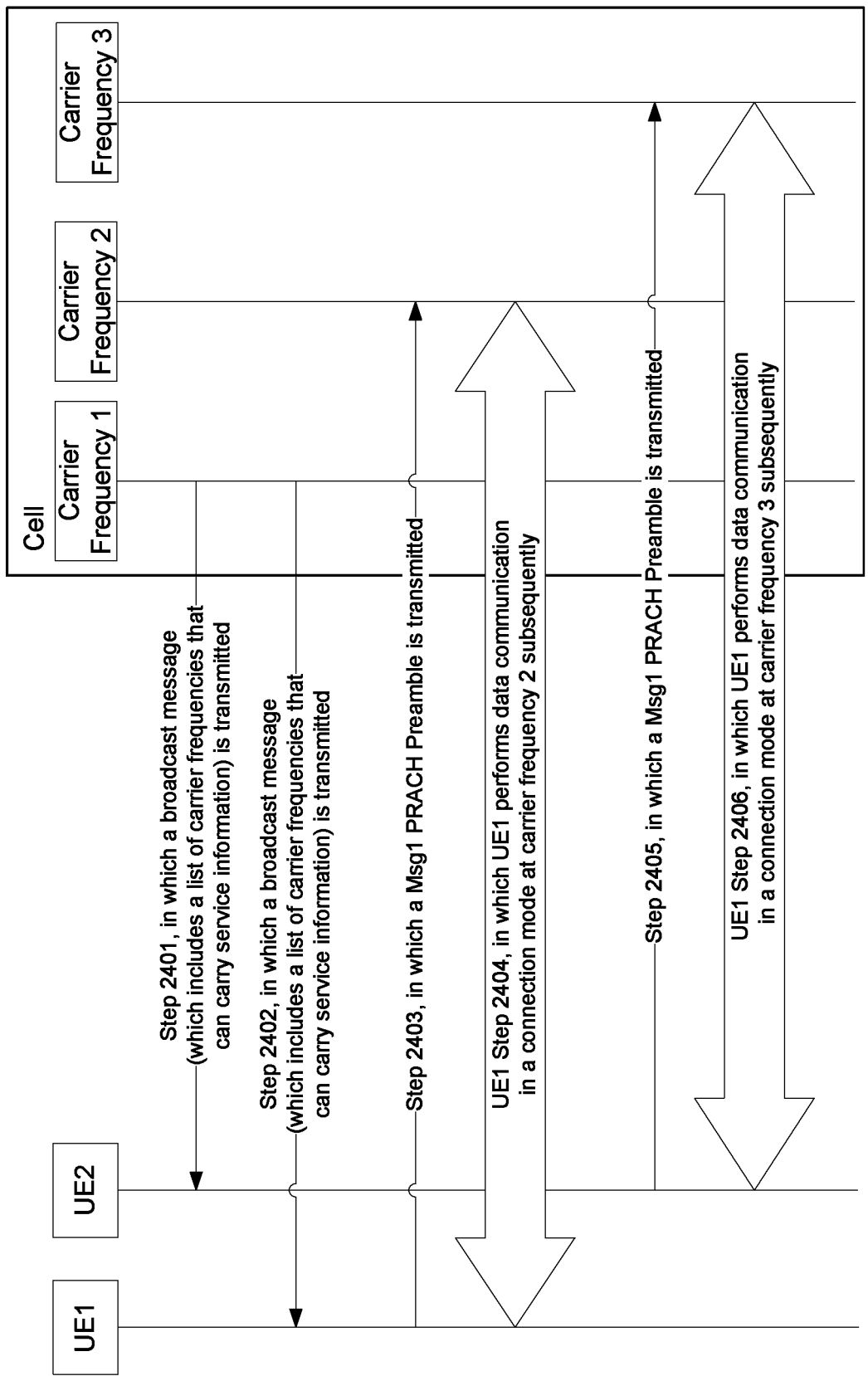
FIG. 24 is a flow chart of embodiment XII of the disclosed technologies.

FIG. 24 is a flow chart of embodiment XII of the disclosed technologies. This embodiment explains a process of selecting a carrier when UE triggers traffic access request in a multi-carrier cell.

In step 2401, UE 2 monitors carrier frequency 1 carrying a broadcast channel and receives broadcast information, wherein the broadcast information carries a list of carrier frequencies that can carry service information.

In step 2402, UE 1 monitors carrier frequency 1 carrying a broadcast channel and receives broadcast information, wherein the broadcast information carries a list of carrier frequencies that can carry service information.

In step 2403, UE 1 selects one of the carrier frequencies, carrier frequency 2, as a carrier for service information according to a predefined rule so as to initiate a random access request (Msg1 PRACH Preamble).

In step 2404, UE1 performs subsequent data communication in a connection mode at carrier frequency 2.

In step 2405, UE 2 selects one of the carrier frequencies, carrier frequency 3, as a carrier frequency for service information according to the predefined rule so as to initiate a random access request (Msg1 PRACH Preamble).

In step 2406, UE 2 performs subsequent data communication in a connection mode at carrier frequency 3.

The predefined rule may be a method of determining a service carrier frequency based on an ID of the UE and a mod operation of the number of service carrier frequencies, or the like.

Figure 25:
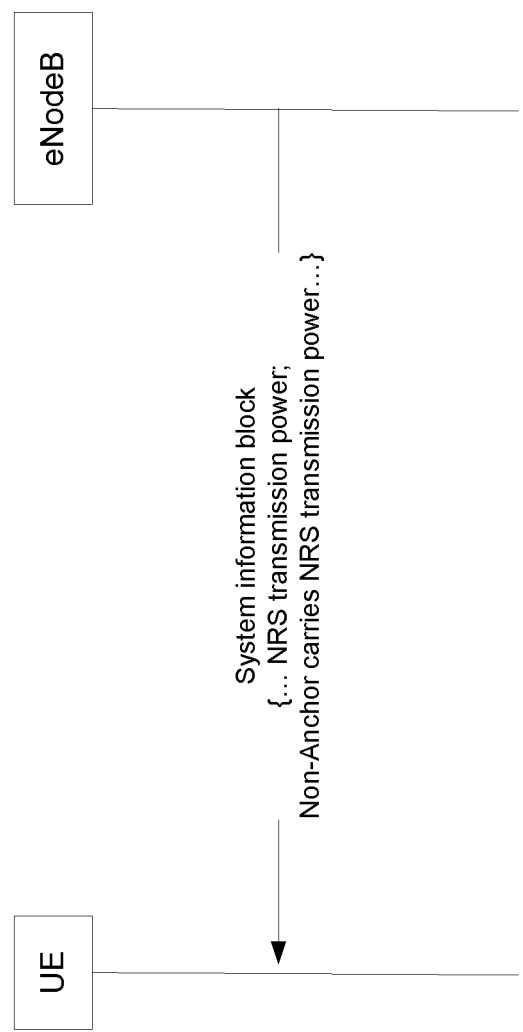
FIG. 25 is a flow chart of embodiment XIII of the disclosed technologies.

FIG. 25 is a flow chart of embodiment XIII of the disclosed technologies. This embodiment explains a method of an eNodeB transmitting information for transmission power of an NRS of traffic carrier to UE through a system message block.

In the present embodiment, the eNodeB transmits to the UE a broadcast message, which contains the following two information elements:

NRS transmission power to indicate transmission power of an NRS of an Anchor carrier; and Non-Anchor carrier NRS transmission power to indicate transmission power of an NRS of a Non-Anchor carrier.

The Non-Anchor carrier NRS transmission power may be an absolute value of transmission power, for example, in the range of (−60 . . . 50) dBm.

The Non-Anchor carrier NRS transmission power may also be a relative value of the transmission power of an NRS of a Non-Anchor carrier relative to the transmission power of an NRS of an Anchor carrier, for example, in the range of (−30 . . . 30) dB or (0 . . . 100)%.

It is to be noted that each of the above modules may be implemented with software or hardware. The latter may be implemented in a way that may be, but is not limited to: all the above modules are located in a same processor; or, the above modules are located in multiple processors, respectively.

An embodiment of the disclosed technologies also provides a storage medium. Alternatively, in the present embodiment, the storage medium may be configured to store program code for executing the following steps:

step S102, in which UE determines whether information of a service carrier frequency sent by a base station is received, wherein the service carrier frequency is the service carrier frequency to carry traffic selected by the base station according to a load situation when a target cell carrying the UE is a multi-carrier cell; and step S104, in which the UE resides at a service carrier frequency corresponding to the information of a service carrier frequency, if the determination result is yes; and, otherwise, the UE operates at an original camped service carrier frequency.

Alternatively, the storage medium is further configured to store program code for executing the following steps:

step S302, in which a base station determines whether a target cell carrying UE is a multi-carrier cell; and step S304, in which, if the determination result is yes, the base station selects a carrier frequency carrying traffic according to a load situation in the target cell and transmits information for the carrier frequency selected to the UE.

Alternatively, the storage medium is further configured to store program code for executing the following steps:

step S502, in which UE determines whether broadcast information of a multi-carrier cell carries a Paging carrier frequency list and/or a number of Paging carrier frequencies, wherein the Paging carrier frequency list includes a carrier frequency for carrying a Paging message, and the number of Paging carrier frequencies is used to determine the Paging carrier frequency list; and step S504, in which, if the determination result is yes, the UE selects a carrier frequency as a carrier frequency for receiving Paging and/or carrying traffic in the Paging carrier frequency list according to a preconfigured rule.

Alternatively, the storage medium is further configured to store program code for executing the following steps:

step S702, in which a base station determines a Paging carrier frequency list and/or a number of Paging carrier frequencies, wherein the Paging carrier frequency list includes a carrier frequency for carrying a Paging message, the Paging carrier frequency list is used by user equipment (UE) to select a carrier frequency as a carrier frequency for receiving Paging and/or carrying traffic in the Paging carrier frequency list according to a preconfigured rule, and the number of Paging carrier frequencies is used to determine the Paging carrier frequency list; and step S704, in which the base station carries the Paging carrier frequency list and/or the number of Paging carrier frequencies in broadcast information of a multi-carrier cell.

Alternatively, the storage medium is further configured to store program code for executing the following steps:

step S902, in which UE acquires a carrier frequency for carrying Paging information and/or traffic through a PDCCH carrying Paging indication information; and step S904, in which the UE performs transmission of subsequent Paging information and/or a subsequent service at the carrier frequency.

Alternatively, the storage medium is further configured to store program code for executing the following steps:

step S1102, in which a base station determines a carrier frequency carrying Paging information and/or traffic step S1104, in which the base station indicates, through a PDCCH carrying Paging indication information, to UE a carrier frequency carrying Paging information and/or traffic, the carrier frequency being used by the UE to perform transmission of subsequent Paging information and/or a subsequent service at the carrier frequency.

Alternatively, the storage medium is further configured to store program code for executing the following steps:

determining, by UE, whether a service carrier frequency list is carried in broadcast information of a multi-carrier cell, wherein the service carrier frequency list includes a carrier frequency for carrying traffic; and if the determination result is yes, selecting, by the UE, a carrier frequency as a carrier frequency at which the UE initiates traffic request in the service carrier frequency list according to a preconfigured rule.

Alternatively, the storage medium is further configured to store program code for executing the following steps:

determining, by a base station, a service carrier frequency list, wherein the service carrier frequency list includes a carrier frequency for carrying traffic, and is used by UE to select a carrier frequency at which the UE initiates traffic request in the service carrier frequency list according to a preconfigured rule; and carrying, by the base station, the service carrier frequency list in broadcast information of a multi-carrier cell.

Alternatively, in the present embodiment, the storage medium may include, but is not limited to, a variety of media that can store program code, such as a USB disk, a Read-Only Memory (ROM), a Random Access Memory (RAM), a mobile hard disk, a magnetic disc and a CD.

Alternatively, the examples described in the above embodiments and alternative embodiments may be referred to for a specific example in the present embodiment, which will not be described herein.

It will be apparent to those skilled in the art that the respective modules or steps of the disclosed technologies may be implemented with a general purpose computing device and may be concentrated in a single computing device or distributed over a network composed of a plurality of computing devices. Alternatively, they may be implemented with program code executable by a computing device, so that they may be stored in a storage device to be executed by the computing device and, in some cases, they may be implemented by executing the steps shown or described in an order different from that described herein, or by separately making them into individual integrated circuit modules, or by making a plurality of modules or steps of them into a single integrated circuit module. Thus, the disclosed technologies are not limited to any particular combination of hardware and software.

The foregoing is only preferred embodiments of the disclosed technologies and is not for use in limiting the protection scope thereof, and for those skilled in the art, there may be various modifications and changes. Any modification, equivalent substitution, and improvement without departing from the spirit and principle of the disclosed technologies should be covered in the protection scope of this patent document.

INDUSTRIAL APPLICABILITY

As described above, a carrier frequency selecting method and apparatus provided by embodiments of the disclosed technologies have the following beneficial effects: the problem that a service carrier frequency selecting strategy in related techniques is to perform selection passively and lacks initiative is solved, and a technical basis for balancing loads on carrier frequencies carrying traffic is provided and further system efficiency is enhanced for an NB-IoT system, which is mainly to transmit small data.

What is claimed is:

1. A method for wireless communication, comprising:
receiving, at a mobile device, a message from a base station, the message including a carrier frequency list comprising a service carrier frequency selected by the base station for carrying traffic;
operating the mobile device at the service carrier frequency indicated by the message, wherein the service carrier frequency is determined based on a carrier frequency index for the service carrier frequency;
determining, by the mobile device, an energy per resource element of the narrowband reference signal based on information for a transmission power of a narrowband reference signal of the service carrier frequency received from the base station;
performing, by the mobile device, a reference signal received power measurement based on the energy per resource element of the narrowband reference signal; and
determining, by the mobile device, a wireless coverage level of the mobile device by comparing a measured reference signal received power with a reference value, wherein a deviation is selectively added to the measured reference signal received power prior to the comparing depending on whether the service carrier frequency is a non-anchor carrier.

2. The method of claim 1, wherein the message includes a Radio Resource Control (RRC) connection setup, an RRC connection resume, an RRC connection reestablishment, or an RRC connection reconfiguration.

3. The method of claim 1, further comprising:
performing a path loss calculation based on an energy per resource element of the narrowband reference signal provided by the information for the transmission power.

4. The method of claim 1, wherein the carrier frequency index is determined based on an identification of the mobile device and a number of carrier frequencies carrying a paging message.

5. A method for wireless communication, comprising:
transmitting, from a base station to a mobile device, a message including a carrier frequency list comprising a service carrier frequency selected by the base station for carrying traffic, wherein the service carrier frequency is determined based on a carrier frequency index for the service carrier frequency;
transmitting, from the base station to the mobile device, information for a transmission power of a narrowb and reference signal of the service carrier frequency selected by the base station to enable the mobile device to determine an energy per resource element of the narrowband reference signal and to perform a reference signal received power measurement based on the transmission power such that a wireless coverage level of the mobile device is determined by comparing a measured reference signal received power with a reference value, wherein a deviation is selectively added to the measured reference signal received power prior to the comparing depending on whether the service carrier frequency is a non-anchor carrier.

6. The method of claim 5, wherein the message includes a Radio Resource Control (RRC) connection setup message, an RRC connection resume message, an RRC connection reestablishment message, or an RRC connection reconfiguration message.

7. The method of claim 5, wherein the carrier frequency index is determined based on an identification of the mobile device and a number of carrier frequencies carrying a paging message.

8. An apparatus for wireless communication, comprising:
a receiver configured to:
receive a message from a base station, the message including a carrier frequency list comprising a service carrier frequency selected by the base station for carrying traffic, and
a processor configured to:
operate the apparatus at the service carrier frequency indicated by the message, wherein the service carrier frequency is determined based on a carrier frequency index for the service carrier frequency; and
determine an energy per resource element of a narrowb and reference signal of the service carrier frequency based on information for a transmission power of the narrowband reference signal received from the base station;
perform a reference signal received power measurement based on the energy per resource element of the narrowband reference signal; and
determine a wireless coverage level by comparing a measured reference signal received power with a reference value, wherein a deviation is selectively added to the measured reference signal received power prior to the comparing depending on whether the service carrier frequency is a non-anchor carrier.

9. The apparatus of claim 8, wherein the message includes a Radio Resource Control (RRC) connection setup, an RRC connection resume, an RRC connection reestablishment, or an RRC connection reconfiguration.

10. The apparatus of claim 8, wherein the processor is further configured to perform a path loss calculation based on an energy per resource element of the narrowband reference signal provided by the information for the transmission power.

11. The device of claim 8, wherein the carrier frequency index is determined based on an identification of the mobile device and a number of carrier frequencies carrying a paging message.

12. An apparatus for wireless communication, comprising:
a processor configured to select a service carrier frequency for carrying traffic; and
a transmitter configured to:
transmit, to a mobile device, a message including a carrier frequency list comprising the service carrier frequency selected for carrying traffic, wherein the service carrier frequency is determined based on a carrier frequency index for the service carrier frequency;
transmit, to the mobile device, information for a transmission power of a narrowband reference signal of the service carrier frequency selected by the base station to enable the mobile device to determine an energy per resource element of the narrowband reference signal and to perform a reference signal received power measurement based on the transmission power such that a wireless coverage level of the mobile device is determined by comparing a measured reference signal received power with a reference value, wherein a deviation is selectively added to the measured reference signal received prior to the comparing depending on whether the service carrier frequency is a non-anchor carrier.

13. The apparatus of claim 12, wherein the message includes a Radio Resource Control (RRC) connection setup, an RRC connection resume, an RRC connection reestablishment, or an RRC connection reconfiguration.

14. The device of claim 12, wherein the carrier frequency index is determined based on an identification of the mobile device and a number of carrier frequencies carrying a paging message.

15. A non-transitory computer readable medium having code stored thereon, the code when executed by a processor, causing the processor to:
  receive, at a mobile device, a message from a base station, the message including a carrier frequency list comprising a service carrier frequency selected by the base station for carrying traffic;
  operate the mobile device at the service carrier frequency indicated by the message, wherein the service carrier frequency is determined based on a carrier frequency index for the service carrier frequency;
  determine an energy per resource element of the narrowband reference signal based on information for a transmission power of a narrowband reference signal of the service carrier frequency received from the base station;
  perform a reference signal received power measurement based on the energy per resource element of the narrowband reference signal; and
  determine a wireless coverage level by comparing a measured reference signal received power with a reference value, wherein a deviation is selectively added to the measured reference signal received power prior to the comparing depending on whether the service carrier frequency is a non-anchor carrier.

16. The non-transitory computer readable medium of claim 15, wherein the message includes a Radio Resource Control (RRC) connection setup, an RRC connection resume, an RRC connection reestablishment, or an RRC connection reconfiguration.

17. The non-transitory computer readable medium of claim 15, wherein the code, when executed by the processor, causes the processor to:
  perform a path loss calculation based on an energy per resource element of the narrowband reference signal provided by the information for the transmission power.

18. The non-transitory computer readable medium of claim 15, wherein the carrier frequency index is determined based on an identification of the mobile device and a number of carrier frequencies carrying a paging message.

19. A non-transitory computer readable medium having code stored thereon, the code when executed by a processor, causing the processor to:
  transmit, from a base station to a mobile device, a message including a carrier frequency list comprising a service carrier frequency selected by the base station for carrying traffic, wherein the service carrier frequency is determined based on a carrier frequency index for the service carrier frequency;
  transmitting, from the base station to the mobile device, information for a transmission power of a narrowband reference signal of the service carrier frequency selected by the base station to enable the mobile device to determine an energy per resource element of the narrowband reference signal and to perform a reference signal received power measurement based on the transmission power such that a wireless coverage level of the mobile device is determined by comparing a measured reference signal received power with a reference value, wherein a deviation is selectively added to the measured reference signal received power prior to the comparing depending on whether the service carrier frequency is a non-anchor carrier.

20. The non-transitory computer readable medium of claim 19, wherein the message includes a Radio Resource Control (RRC) connection setup message, an RRC connection resume message, an RRC connection reestablishment message, or an RRC connection reconfiguration message.

21. The non-transitory computer readable medium of claim 19, wherein the carrier frequency index is determined based on an identification of the mobile device and a number of carrier frequencies carrying a paging message.

* * * * *